(12) United States Patent
Hasegawa et al.

(10) Patent No.: US 9,007,481 B2
(45) Date of Patent: Apr. 14, 2015

(54) INFORMATION PROCESSING DEVICE AND METHOD FOR RECOGNITION OF TARGET OBJECTS WITHIN AN IMAGE

(75) Inventors: Yuichi Hasegawa, Tokyo (JP); Ning Zhou, Tokyo (JP)

(73) Assignee: Sony Corporation, Tokyo (JP)

( * ) Notice: Subject to any disclaimer, the term of this patent is extended or adjusted under 35 U.S.C. 154(b) by 340 days.

(21) Appl. No.: 13/299,035

(22) Filed: Nov. 17, 2011

(65) Prior Publication Data
US 2012/0194697 A1 Aug. 2, 2012

(30) Foreign Application Priority Data
Nov. 24, 2010 (JP) ................................ P2010-260869

(51) Int. Cl.
| | | |
|---|---|---|
| *H04N 5/228* | (2006.01) | |
| *G06K 9/00* | (2006.01) | |
| *G06K 9/46* | (2006.01) | |
| *G06K 9/48* | (2006.01) | |
| *G06K 9/62* | (2006.01) | |
| *G06T 7/00* | (2006.01) | |

(52) U.S. Cl.
CPC .......... *G06K 9/00355* (2013.01); *G06K 9/4619* (2013.01); *G06K 9/48* (2013.01); *G06K 9/6256* (2013.01); *G06T 7/004* (2013.01); *G06T 2207/20016* (2013.01); *G06T 2207/30168* (2013.01); *G06T 2207/30196* (2013.01)

(58) Field of Classification Search
CPC ................ H04N 1/00381; G06F 3/017; G06T 2207/20016; G06T 2207/30168; G06T 2207/30196; G06T 2207/30201; G06T 7/004; G06K 2009/00395; G06K 9/00335–9/00389; G06K 9/4619; G06K 9/48; G06K 9/6256

USPC .......... 348/77, 78, 169–172, 207.99–207.11, 348/211.99–211.14, 222.1, 223.1, 348/240.99–240.3; 382/103–105, 115–127, 382/181–231; 396/287
See application file for complete search history.

(56) References Cited

U.S. PATENT DOCUMENTS

| | | | |
|---|---|---|---|
| 2004/0190776 A1* | 9/2004 | Higaki et al. | 382/190 |
| 2006/0126894 A1* | 6/2006 | Mori | 382/103 |
| 2007/0147826 A1* | 6/2007 | Matsuzaki et al. | 396/287 |
| 2008/0024620 A1* | 1/2008 | Yoshida et al. | 348/222.1 |
| 2009/0103778 A1* | 4/2009 | Yoshizumi et al. | 382/103 |
| 2009/0153655 A1* | 6/2009 | Ike et al. | 348/77 |
| 2010/0239119 A1* | 9/2010 | Bazakos et al. | 382/103 |

FOREIGN PATENT DOCUMENTS

| | | |
|---|---|---|
| JP | 11-128535 | 5/1999 |
| JP | 2010-108475 | 5/2010 |

* cited by examiner

*Primary Examiner* — Dennis Hogue
(74) *Attorney, Agent, or Firm* — Oblon, McClelland, Maier & Neustadt, L.L.P.

(57) ABSTRACT

An information processing apparatus, information processing method and computer program product cooperate in detecting a first target object contained in image information. Image information of an image is received through an interface. A processing circuit determines whether a first target object in the image information has not yet been detected. A determination is also made regarding whether a second target object in the image information has been detected. An image quality parameter of the image is modified to assist subsequent detection attempts in recognizing the first target object when the first target object has not yet been detected but the second target object has been detected.

20 Claims, 28 Drawing Sheets

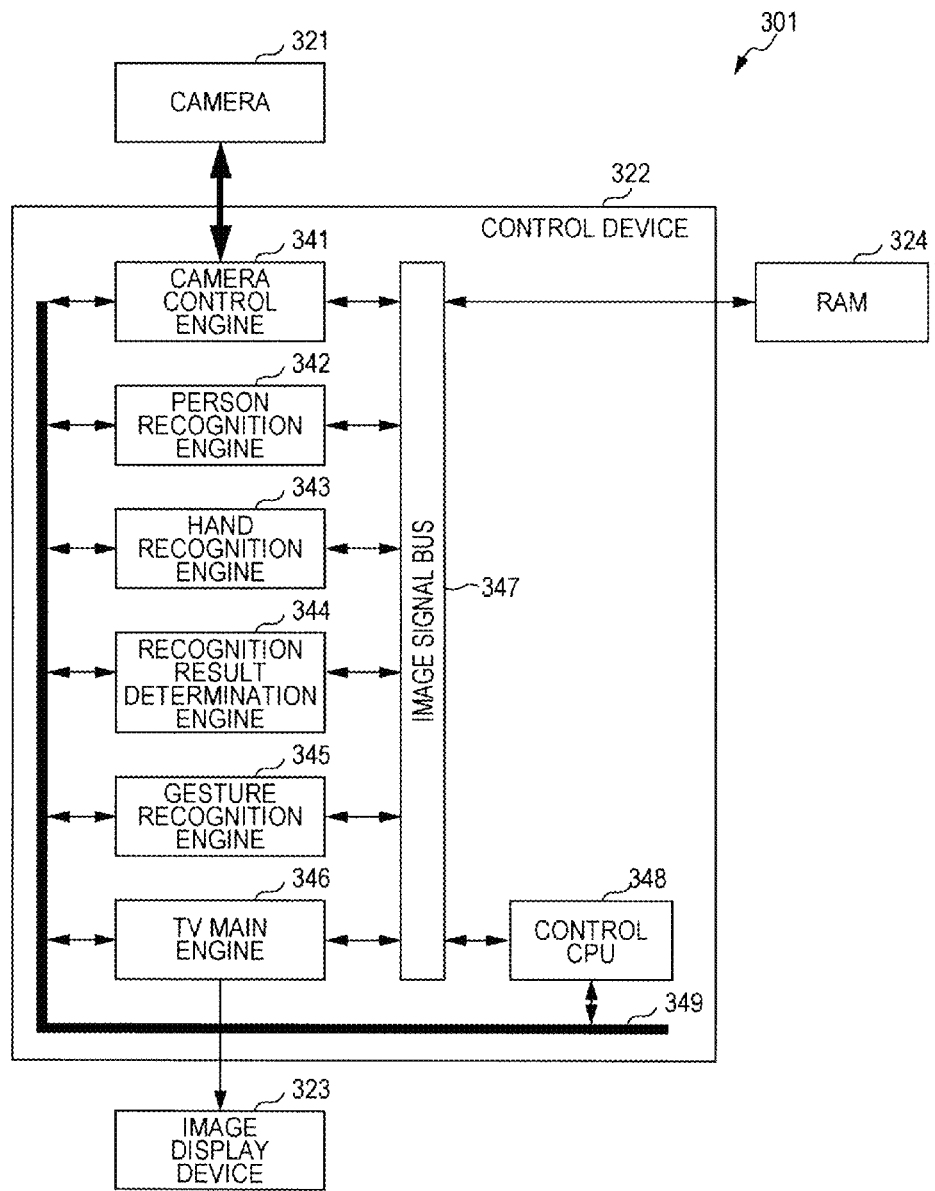

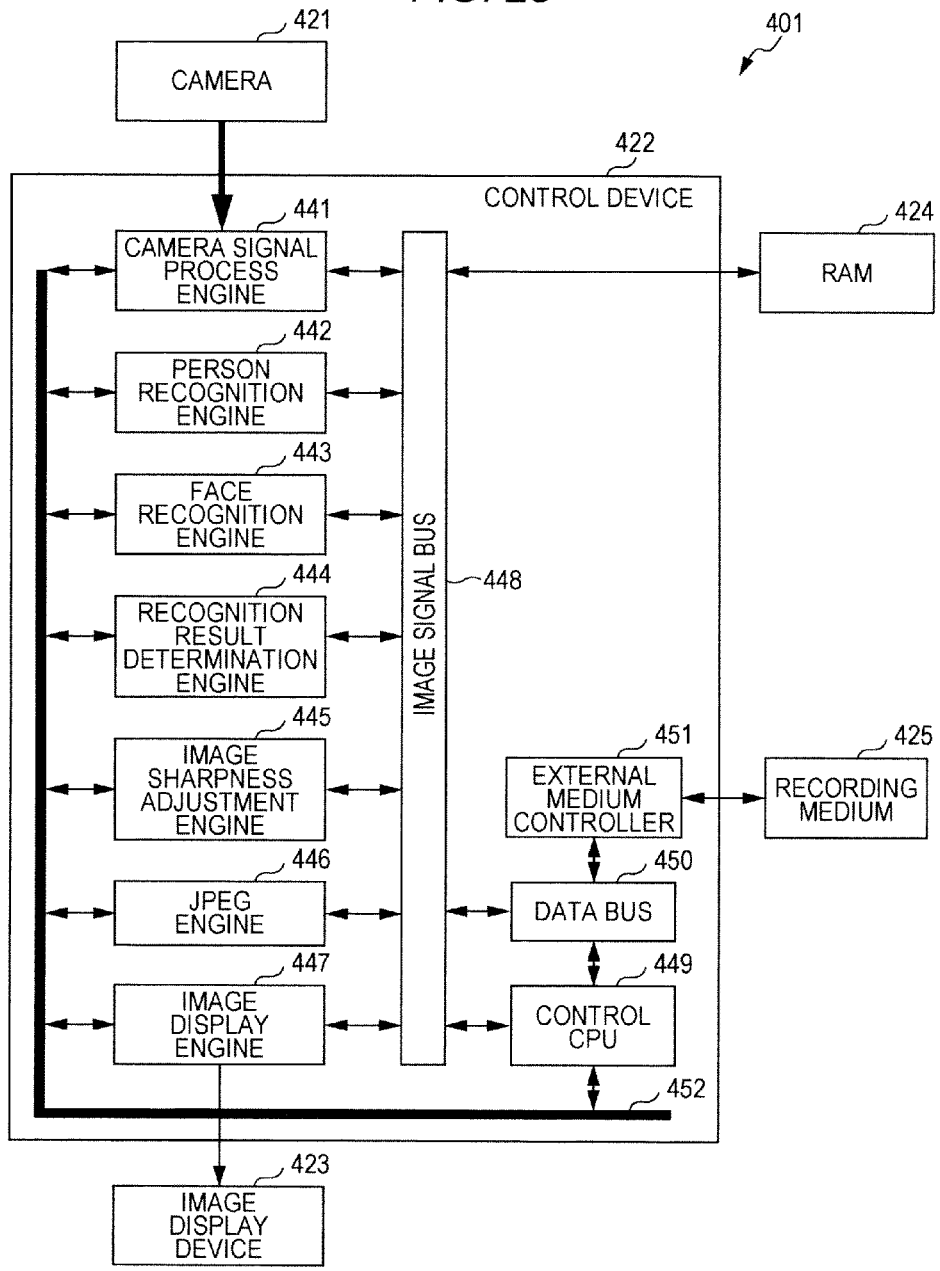

INFORMATION PROCESSING DEVICE AND METHOD FOR RECOGNITION OF TARGET OBJECTS WITHIN AN IMAGE

BACKGROUND

The present disclosure relates to an information processing device, method, and computer program product, and in particular, to an information processing device, method and a computer program product which more reliably recognizes a target object.

As shown in FIG. 1, operation of an electrical apparatus such as a television image reception device 12 is performed by a hand 2 of a user 1 being recognized using a camera 11 and using a gesture of a pattern of movement of the hand 2.

In addition, the face of a user is recognized in a case of imaging using a camera and automatic controlling of parameters such as focus and balance of color is performed based on information on the recognized face.

An image recognition device for executing processing in such a manner recognizes, for example, people, faces, and hands (for example, refer to Unexamined Japanese Patent Application Publication 2010-108475). In addition, among image recognition devices, there are also devices which recognize postures of people (for example, refer to Unexamined Japanese Patent Application Publication 11-128535).

SUMMARY

However, in a case where an obtained image is not an appropriate image, an image recognition device is not able to recognition a target object.

FIGS. 2A to 3B show examples of images which are not appropriate for recognition of a target object. FIG. 2A shows an example of an image which is too bright. FIG. 2B shows an example of an image which is too dark. FIG. 3A shows an example of an image which is out of focus. FIG. 3B shows an example where a recognized target object (for example, a hand 5 or a face 6) is small.

In such a case, it is difficult for the image recognition device to recognize target objects such as the hand 5 and the face 6.

It is desirable that it is possible to more reliably recognize a target object.

According to one embodiment, an information processing apparatus includes an interface that receives image information of an image; and a processing circuit that determines whether a first target object in the image information has not yet been detected, determines that a second target object in the image information has been detected, and modifies an image quality parameter of the image to recognize the first target object in a subsequent detection attempt, when it is determined that the first target object is not detected but the second target object is detected.

According to one aspect of the embodiment, the first target object is related to the second target object by at least one of a relative size and the first target object being a part of the second target object.

According to another aspect of the embodiment the image quality parameter is one of a camera control parameter, and an image processing parameter.

According to another aspect of the embodiment the image quality parameter is the camera control parameter, and the camera control parameter is one of a zoom ratio, a focus position, an aperture value, a shutter time, a gain value, a color adjustment value, and a camera orientation direction.

According to another aspect of the embodiment the image quality parameter is the image processing parameter, and the image processing parameter is one of a brightness setting, a contrast setting, a color conversion, a sharpness value, a focus setting, and a digital zoom ratio.

According to another aspect of the embodiment the first target object is a part of a human body, and the second target object is the human body.

According to another aspect of the embodiment the first target object is a part of a machine, and the second target object is the machine.

According to another aspect of the embodiment the processing circuit modifies the image quality parameter and recognizes the first target object in the subsequent detection attempt in real time.

According to another aspect of the embodiment the processing circuit further detects a posture of at least one of the part of the human body and the human body.

According to another aspect of the embodiment a camera, the camera being one of a digital still camera and a television camera.

According to an image processing method embodiment, the method includes receiving image information of an image through an interface; determining with a processing circuit whether a first target object in the image information has not yet been detected; determining that a second target object in the image information has been detected; and modifying an image quality parameter of the image to recognize the first target object in a subsequent detection attempt, when it is determined that the first target object is not detected but the second target object is detected.

According to one aspect of this embodiment the first target object is related to the second target object by at least one of a relative size and the first target object being a part of the second target object.

According to another aspect of the embodiment the image quality parameter is one of a camera control parameter, and an image processing parameter.

According to another aspect of the embodiment the image quality parameter is the camera control parameter, and the camera control parameter is one of a zoom ratio, a focus position, an aperture value, a shutter time, a gain value, a color adjustment value, and a camera orientation direction.

According to another aspect of the embodiment the image quality parameter is the image processing parameter, and the image processing parameter is one of a brightness setting, a contrast setting, a color conversion, a sharpness value, a focus setting, and a digital zoom ratio.

According to another aspect of the embodiment the first target object is a part of a human body, and the second target object is the human body.

According to another aspect of the embodiment the first target object is a part of a machine, and the second target object is the machine.

According to another aspect of the embodiment the modifying and recognizing the first target object in the subsequent detection attempt are performed in real time.

According to another aspect of the embodiment detecting a posture of at least one of the part of the human body and the human body.

According to a non-transitory computer readable storage device embodiment, the storage device has instructions stored therein that when executed by a processing circuit perform a method, the method including receiving image information of an image; determining with the processing circuit whether a first target object in the image information has not yet been detected; determining that a second target object in the image information has been detected; and modifying an image quality parameter of the image to recognize the first target object in a subsequent detection attempt, when it is determined that the first target object is not detected but the second target object is detected.

According to the embodiments of the disclosure, it is possible to more reliably recognize a target object.

BRIEF DESCRIPTION OF THE DRAWINGS

FIG. 27 is a block diagram illustrating a configuration example of a television image reception device control system according to an embodiment of the disclosure; and FIG. 28 is a block diagram illustrating a configuration example of a digital camera control system according to an embodiment of the disclosure.

DETAILED DESCRIPTION OF EMBODIMENTS

Figure 1:
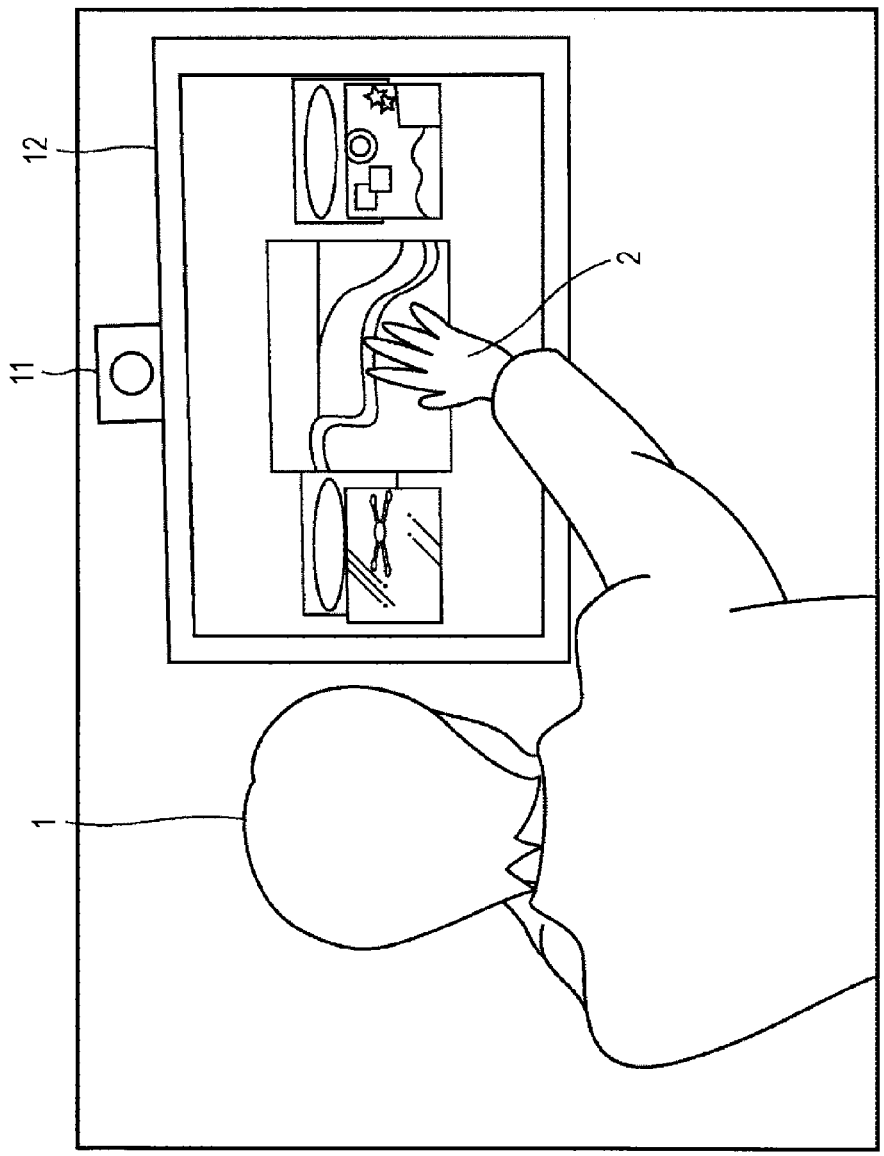
FIG. 1 is a diagram illustrating an example of gesture recognition using a camera.
Figure 2A:
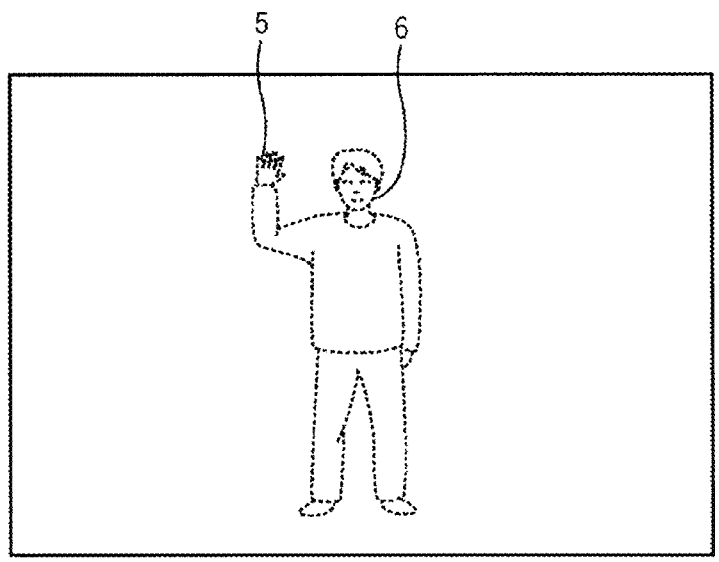
FIGS. 2A and 2B are diagrams illustrating examples of images which are not appropriate for recognition.
Figure 2B:
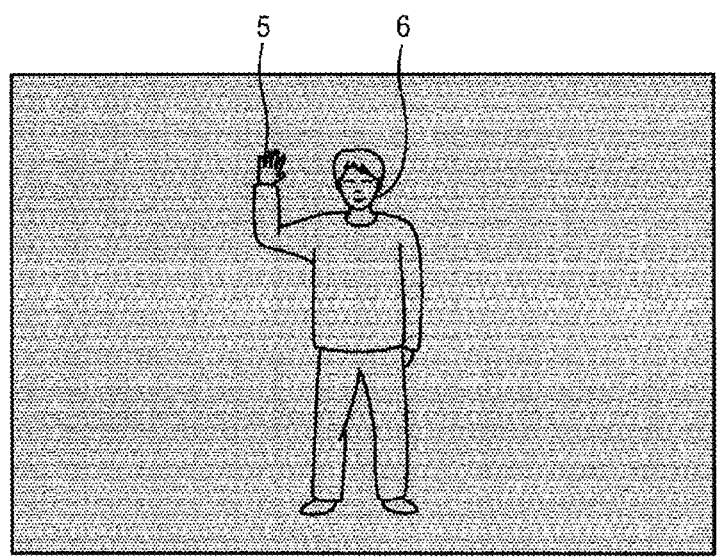
Figure 3A:
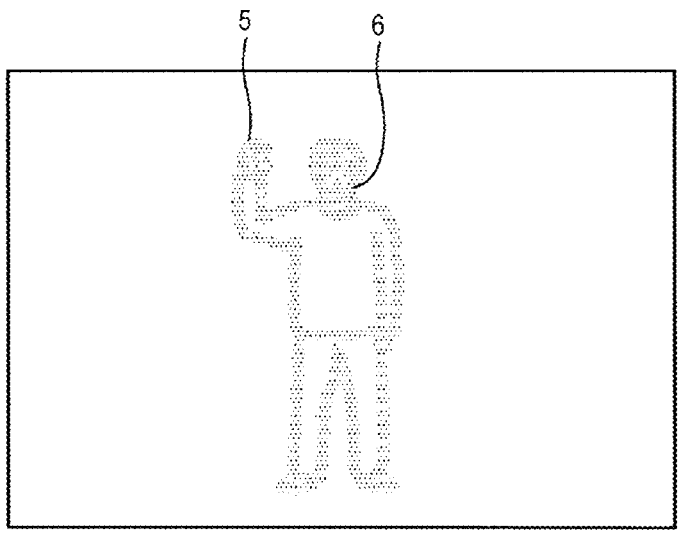
FIGS. 3A and 3B are diagrams illustrating examples of images which are not appropriate for recognition.
Figure 3B:
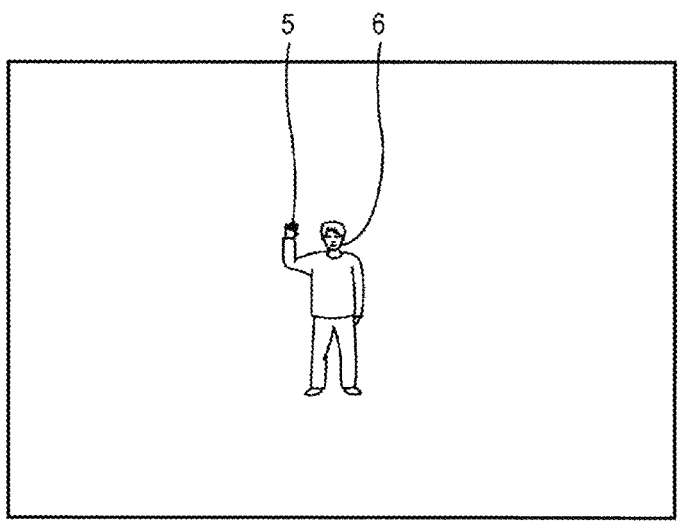
Figure 4:
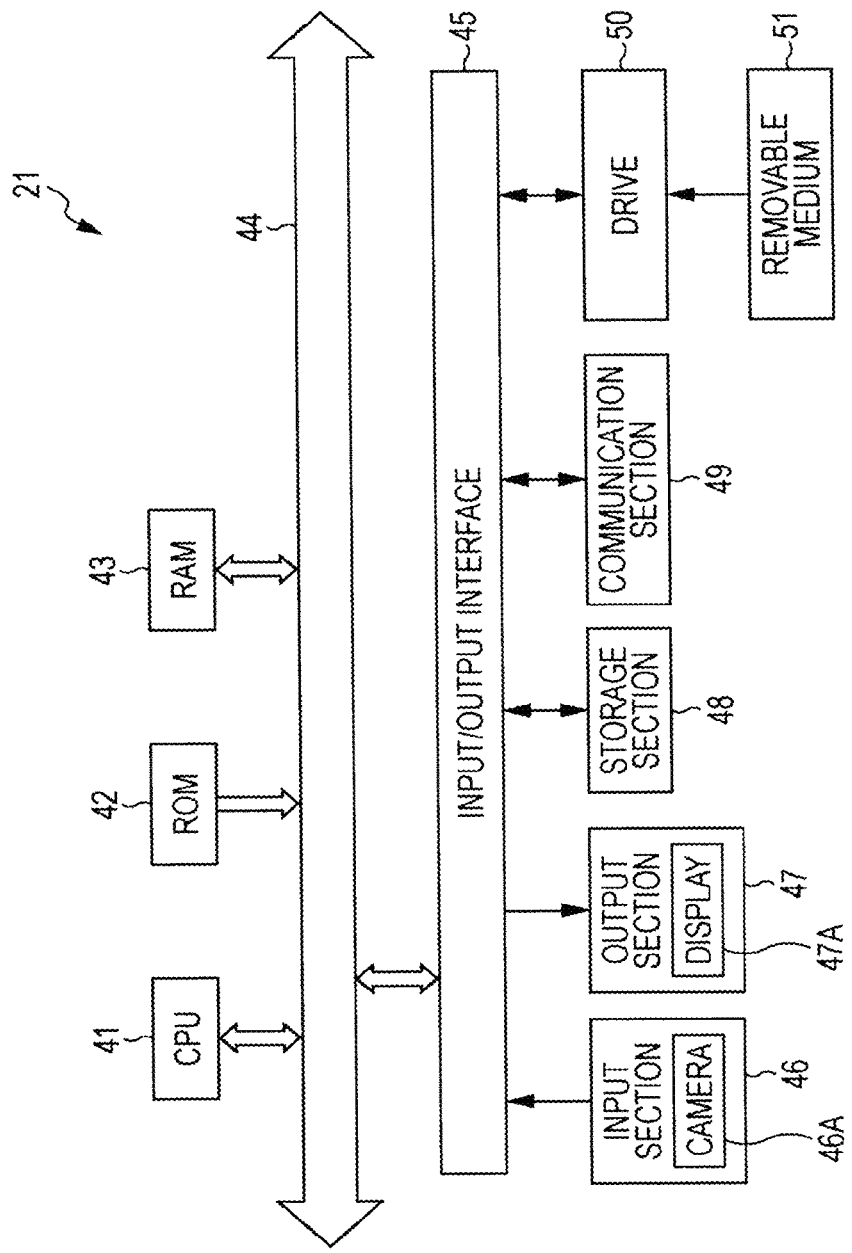
FIG. 4 is a block diagram illustrating a configuration example of hardware of a personal computer according to an embodiment of the disclosure.

The embodiments of the disclosure will be described below. Here, the description will be given in the following order.
1. Configuration of Personal Computer
2. Configuration of Second Recognition Section
3. Configuration of Contour Feature Quantity Calculation Section
4. Recognition Process
5. Contour Feature Quantity Calculation Process
6. Target Object Recognition Process 1
7. Target Object Recognition Process 2
8. Configuration of Posture Recognition Section
9. Target Object Recognition Process 3
10. Posture Recognition Process
11. Configuration of Television Image Reception Device Control System
12. Configuration of Digital Camera Control System
13. Other Configuration of Personal Computer FIG. 4 is a block diagram which shows a configuration example of hardware of a personal computer 21 according to an embodiment of the disclosure.

In the personal computer 21 which is an information processing device, a CPU (Central Processing Unit) 41, a ROM (Read Only Memory) 42, and a RAM (Random Access Memory) 43 are connected to each other by a bus 44.

In the bus 44, an input/output interface 45 is further connected. In the input/output interface 45, an input section 46, an output section 47, a storage section 48, a communication section 49, and a drive 50 are connected.

Other than a keyboard, a mouse, a microphone, or the like, the input section 46 has a camera 46A. Other than a speaker or the like, the output section 47 has a display 47A.

The camera 46A is arranged in a position where it is possible to capture images of a user who views the display 47A. The display 47A displays images which correspond to various applications, and when necessary, images captured using the camera 46A.

The storage section 48 is formed by a hard disk, a nonvolatile memory, or the like. The communication section 49 is formed by a network interface or the like. The drive 50 operates a removable medium 51 such as a magnetic disc, an optical disc, a magneto-optical disc, or a semiconductor memory.

In the personal computer 21 configured in this manner, the CPU 41 performs various processes, for example, by a program stored in the storage section 48 being loaded into the RAM 43 via the input/output interface 45 and the bus 44 and executed.

The program executed by the CPU 41 is provided by, for example, being stored in the removable medium 51 which is a package medium or the like.

Here, as the package medium, a magnetic disc (including a floppy disc), an optical disc (a CD-ROM (Compact Disc-Read Only Memory), a DVD (Digital Versatile Disc), or the like), a magneto-optical disc, a semiconductor memory, or the like may be used.

In addition, it is possible for the program to be provided via a wired or a wireless transmission medium such as a local area network, the internet, or digital satellite broadcasting.

In the personal computer 21, it is possible for the program to be installed in the storage section 48 via the input/output interface 45 by the removable medium 51 being mounted in the drive 50.

In addition, it is possible for the program to be received by the communication section 49 via a wired or a wireless transmission medium and installed in the storage section 48. Further, it is possible for the program to be installed in advance in the ROM 42 or the storage section 48.

Figure 5:
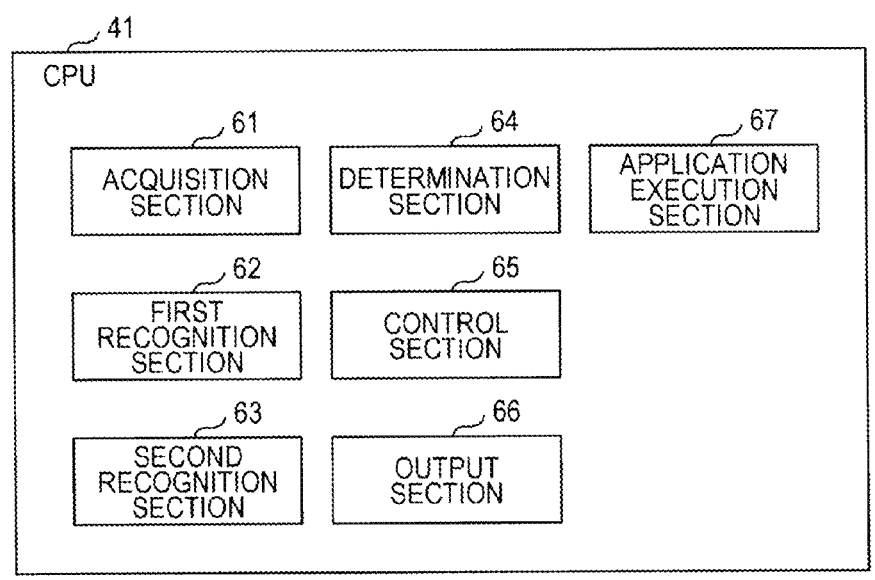
FIG. 5 is a block diagram illustrating a functional configuration example of a CPU.

FIG. 5 is a block diagram which shows a functional configuration example of the CPU 41.

The CPU 41 has function blocks of an acquisition section 61, a first recognition section 62, a second recognition section 63, a determination section 64, a control section 65, an output section 66 and an application execution section 67. Here, it is possible for each block of the CPU 41 to transfer signals and data to each other when necessary.

The acquisition section 61 acquires various types of information. The first recognition section 62 and the second recognition section 63 perform a recognition process of recognition target objects which are each different such as hands, faces and people. For example, the first recognition section 62 recognizes hands as the recognition target object and the second recognition section 63 recognizes people as the recognition target object.

The determination section 64 determines various types of information. The control section 65 performs various types of control processes. The output section 66 outputs various types of information. The application execution section 67 executes applications.

As applications, there are, for example, applications which recognize a hand gesture in an image and execute commands which correspond to the gesture and applications which recognize a face in an image and improve the image quality of a face region.

That is, the application execution section 67 executes an application which recognizes a target object in an image and performs a predetermined process using the recognition result.

Configuration of Second Recognition Section

Figure 6:
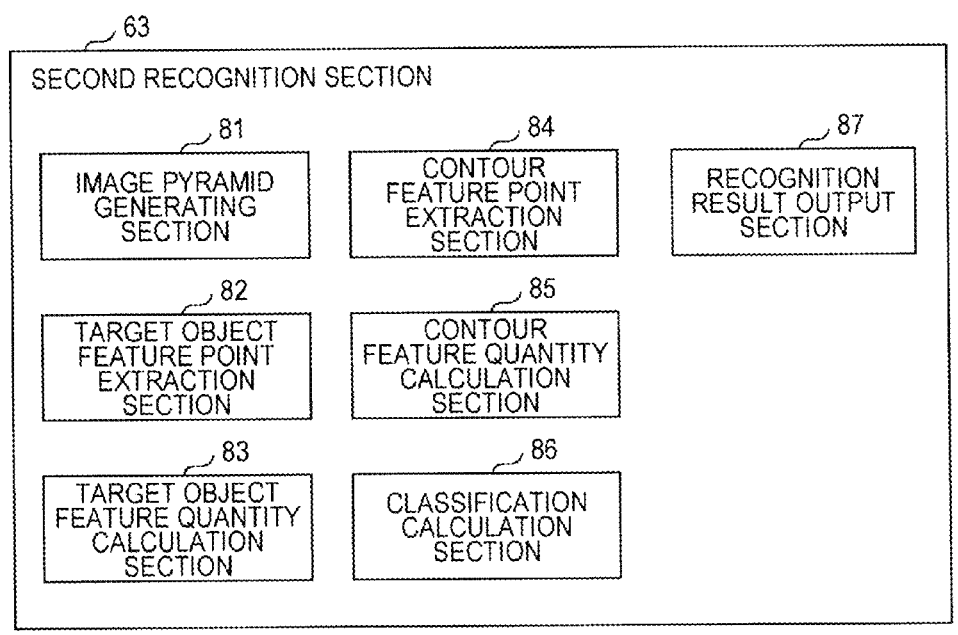
FIG. 6 is a block diagram illustrating a detailed configuration example of a second recognition section.

The first recognition section 62 which recognizes hands has the same configuration to the second recognition section 63 which recognizes people. Here, the configuration of the second recognition section 63 will be described as a representative. FIG. 6 is a block diagram which shows a more detailed configuration example of the second recognition section 63.

The second recognition section 63 is configured from an image pyramid generating section 81, a target object feature point extraction section 82, a target object feature quantity calculation section 83, a contour feature point extraction section 84, a contour feature quantity calculation section 85, a classification calculation section 86, and a recognition result output section 87.

It is possible for each section to transfer signals and data to each other when necessary. This is the same as in FIGS. 6, 7, and 21 which will be described later.

From an acquired image, the image pyramid generating section 81 generates a plurality of images which are each different in resolution as an image pyramid.

For example, an image pyramid with layers of eight resolutions from level 1 to level 8 is generated. Level 1 of the image pyramid has the highest resolution and the resolution of the image pyramid becomes lower in order from level 1 to level 8.

The target object feature point extraction section 82 extracts several pixels of an image from each image, which constitutes the image pyramid generated by the image pyramid generating section 81, as a target object feature point used when recognizing a target object.

With regard to each of the target object feature points extracted by the target object feature point extraction section 82, the target object feature quantity calculation section 83 performs pairing where a target object feature point and another target object feature point are made to be one pair.

In addition, the target object feature quantity calculation section 83 calculates a target object feature quantity which indicates the distance of the texture of two arbitrary regions for each pair of target object feature points based on the image where the target object feature points have been extracted.

The contour feature point extraction section 84 extracts several pixels of an image from each image, which constitutes the image pyramid generated by the image pyramid generating section 81, as a contour feature point used when recognizing a target object.

The contour feature quantity calculation section 85 calculates a contour feature quantity which indicates the extracted contour for each of the contour feature points by a filter process using, for example, a steerable filter, based on the image where the contour feature points have been extracted.

The classification calculation section 86 reads out the feature quantity for classification and the composite classifier stored in advance in the storage section 48. In addition, as a substitute for the read-out composite classifier, the classification calculation section 86 performs calculation of a correspondence to the feature quantity for classification out of the target object feature quantity calculated by the target object feature quantity calculation section 83 or the contour feature quantity calculated by the contour feature quantity calculation section 85.

Here, the composite classifier is generated by integrating a target object classifier and a contour classifier.

The target object classifier and the contour classifier are strong classifiers formed from a plurality of weak classifiers generated in advance using statistical learning and are used when identifying whether or not a region of a target object image is present in an input image using features of the target object (for example, a person).

In addition, the feature quantity for classification is the target object feature quantity of the pair of target object feature points used when performing recognition of a target object using the composite classifier and the contour feature quantity of the contour feature points.

The recognition result output section 87 outputs a classification result of whether or not a target object is recognized in an input image based on the calculation result of the classification calculation section 86.

As described above, since the first recognition section 62 has the same configuration and performs the same processes as the second recognition section 63, a detailed description thereof is omitted.

Configuration of Contour Feature Quantity Calculation Section

Figure 7:
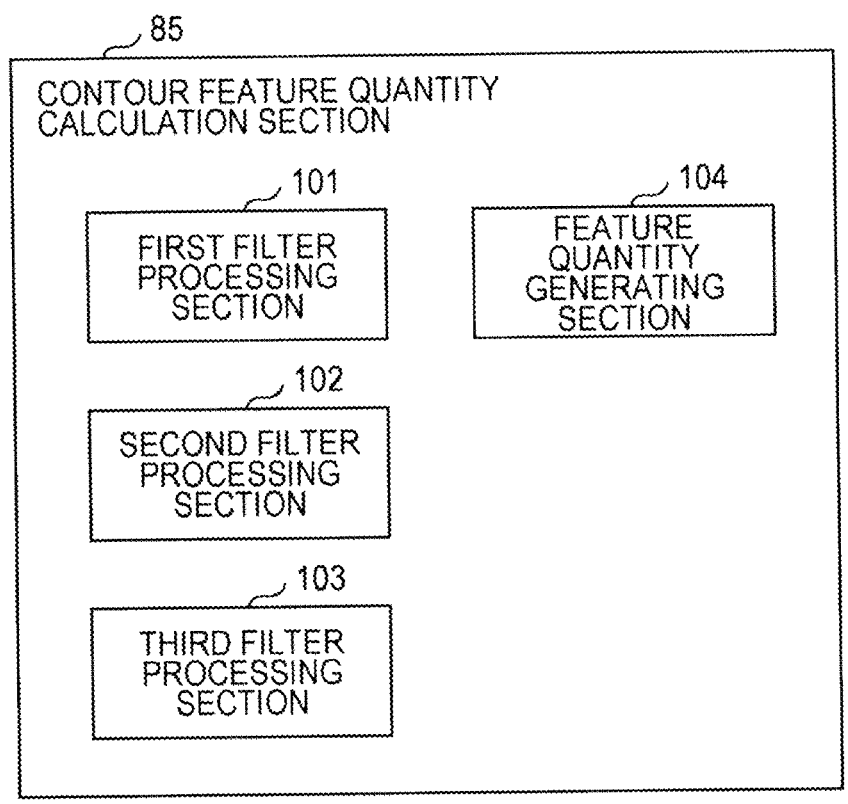
FIG. 7 is a block diagram illustrating a detailed configuration example of a contour feature quantity calculation section.

FIG. 7 is a block diagram which shows a detailed configuration example of a contour feature quantity calculation section 85 in FIG. 6. The contour feature quantity calculation section 85 is configured from a first filter processing section 101, a second filter processing section 102, a third filter processing section 103, and a feature quantity generating section 104.

The image where the contour feature points have been extracted by the contour feature point extraction section 84 is supplied to the first filter processing section 101 to the feature quantity generating section 104 and the contour feature points are supplied to the first filter processing section 101 to the third filter processing section 103.

For each of the contour feature points extracted using the contour feature point extraction section 84, the first filter processing section 101 extracts the feature quantity by executing a filter process using a first order differential function $G_1$ of a Gaussian function G with regard to the contour feature points. Here, the Gaussian function G and the first order differential function $G_1$ are shown by equation (1) and equation (2).

$$G = e^{-\frac{x^2+y^2}{2\sigma^2}} \tag{1}$$

$$G_1(\theta) = \cos(\theta)G_1(0°) + \sin(\theta)G_1(90°) \tag{2}$$

In equation (1), σ indicates Gaussian width. In equation (w), θ indicates an arbitrary angle.

For example, the first filter processing section 101 changes the Gaussian width a of the Gaussian function G into three predetermined values (for example, Gaussian widths σ1, σ2, σ3=1, 2, 4) and calculates equation (2) with regard to four predetermined directions (for example, θ=θ1, θ2, θ3, θ4) for each of the Gaussian widths σ.

Here, the direction θ is not limited to four directions and may be eight directions such as each direction when π is equally divided into eight directions. In addition, in the past, processing was performed using a plurality of Gaussian widths, but in the embodiment, it is sufficient if only one Gaussian width is prepared as will be described later.

In other words, it is not necessary to change the Gaussian width. As such, in the description above, it is described that "the Gaussian width is changed into three predetermined values and equation (2) is calculated with regard to four predetermined directions for each of the Gaussian widths σ", but in the embodiment, it is sufficient if only equation (2) is calculated with regard to four predetermined directions for the set Gaussian width σ.

As such, since it is not necessary to calculate for each of a plurality of Gaussian widths, it is possible to reduce the quantity of calculation. This is the same for other filters, for example, the second filter processing section 102 and the third filter processing section 103.

For each of the extracted contour feature points, the second filter processing section 102 extracts the feature quantity by executing a filter process using a second order differential function $G_2$ of the Gaussian function G with regard to the contour feature points. Equation (3) shows the second order differential function $G_2$, and in equation (3), θ indicates an arbitrary angle.

$$G_2(\theta) = k_{21}(\theta)G_2(0°) + k_{22}(\theta)G_2(60°) + k_{23}(\theta)G_2(120°) \tag{3}$$

In addition, the coefficient $k_{2i}(\theta)$ (where i=1, 2, 3) in equation (3) is a function shown by equation (4).

$$k_{2i}(\theta) = \frac{1}{3}\{1 + 2\cos(2(\theta - \theta i))\} \tag{4}$$

For example, the second filter processing section 102 calculates equation (3) with regard to four predetermined directions (for example, θ=θ1, θ2, θ3, θ4) for each of the predetermined Gaussian widths σ of the Gaussian function G.

For each of the extracted contour feature points, the third filter processing section 103 extracts the feature quantity by executing a filter process using a third order differential function $G_3$ of the Gaussian function G with regard to the contour feature points.

Equation (5) shows the third order differential function $G_3$, and in equation (5), θ indicates an arbitrary angle.

$$G_3(\theta) = k_{31}(\theta)G_3(0°) + k_{32}(\theta)G_3(45°) + k_{33}(\theta)G_3(90°) + k_{34}(\theta)G_3(135°) \tag{5}$$

In addition, the coefficient $k_{3i}(\theta)$ (where i=1, 2, 3) in equation (5) is a function shown by equation (6).

$$k_{3i}(\theta) = \frac{1}{4}\{2\cos(\theta - \theta i) + 2\cos(3(\theta - \theta i))\} \tag{6}$$

For example, the third filter processing section 103 calculates equation (5) with regard to four predetermined directions (for example, θ=θ1, θ2, θ3, θ4) for each of the predetermined Gaussian widths σ of the Gaussian function G.

The feature quantity generating section 104 receives a supply of the feature quantities of each of the contour feature points calculated with regard to the four directions θ from each of the first filter processing section 101, the second filter processing section 102 and the third filter processing section 103, lines up a total of the 12 (=3 (orders)×4 (directions) supplied feature quantities, and sets the feature quantities as the contour feature quantities for the contour feature points.

In addition, in each of the filter processing section 101, 102 and 103, since a plurality of images with different resolutions are supplied from the image pyramid generating section 81, the feature quantities of each of the contour feature points calculated with regard to the four directions θ from each of the images are also supplied.

The supplied feature quantity depends on the number of image generated by the image pyramid generating section 81, and for example, in a case where eight images from level 1 to level 8 are generated, the feature quantities of each of the contour feature points calculated with regard to four directions of eight images are supplied.

In this manner, in the contour feature quantity calculation section 85, the feature quantity (contour) which is different for each order of differentiation is extracted using a filter (basis function), which is obtained by differentiating a Gaussian function and has an ability to selection the direction θ, and are set as the contour feature quantity.

Figure 8:
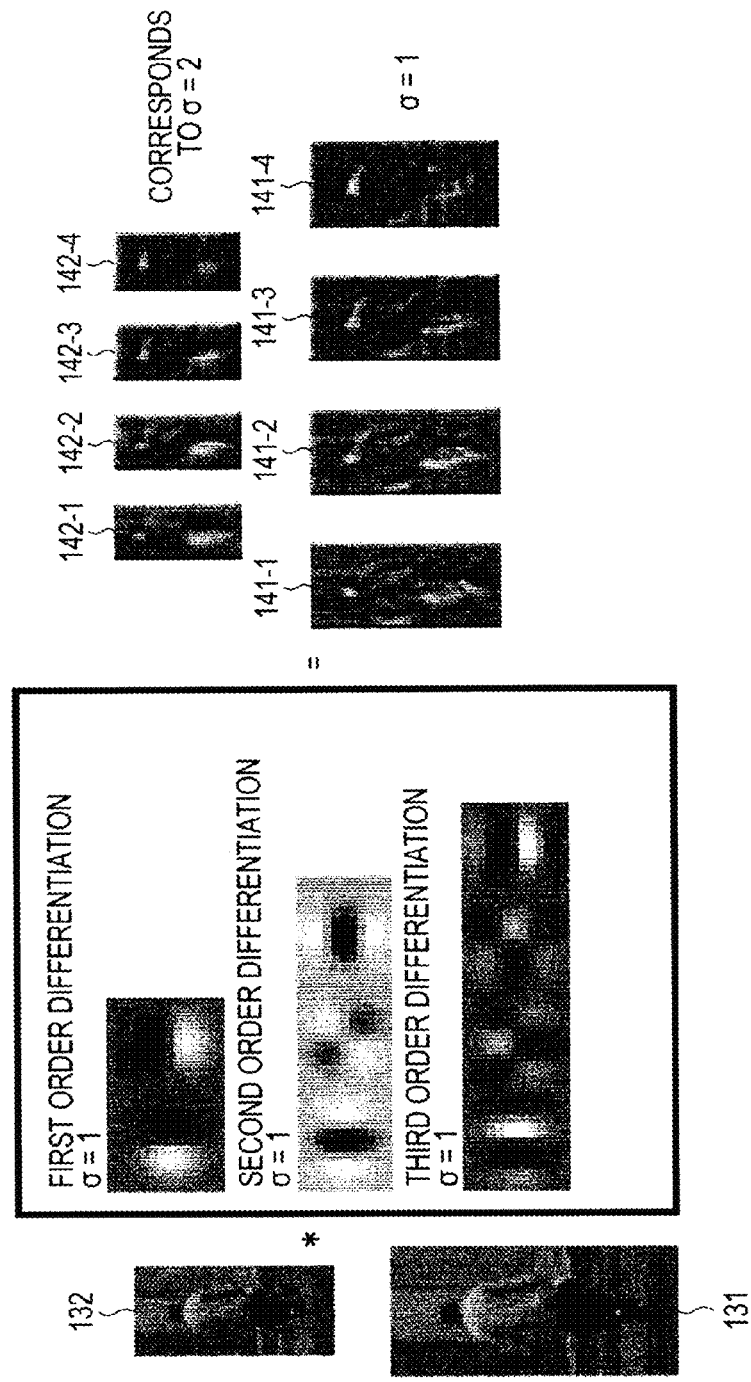
FIG. 8 is a diagram illustrating a result where filter processing has been performed on an image.

FIG. 8 shows a result obtained by performing a filter process using a differential function of the Gaussian function G with regard to an image where a person is imaged. In FIG. 8, images which are targets of a filter process are shown on the left side, filters are shown in the center, and images after the filter process are shown on the right side.

The images shown on the left side of FIG. 8 are two images which configure an image pyramid and are images with different resolutions. For example, the image pyramid generating section 81 generates images with different resolutions from level 1 to level 8. Out of the images, for example, an image 131 which is level 1 and an image 132 which is level 2 are shown on the left side of FIG. 8.

The filters shown in the center of FIG. 8 show an example of filters where the Gaussian width σ of the first order differential function $G_1$, the second order differential function $G_2$, and the third order differential function $G_3$ is equal to one.

The images shown on the right side of FIG. 8 are generated in a case where, out of the filters shown in the center of FIG. 8, for example, the filter with the third order differential function $G_3$ is used and a filter process is performed with regard to the images 131 and 132 shown on the left side of FIG. 8.

That is, when a filter process using the filter with the third order differential function $G_3$ is performed with regard to the image 131, images 141-1 to 141-4 are generated. In addition, when a filter process using the filter with third order differentiation is performed with regard to the image 132, images 142-1 to 142-4 are generated.

Since the filter process was performed using the filter with the third order differential function $G_3$ where the Gaussian width $\sigma$ is one ($\sigma=1$), the images 141-1 to 141-4 are each images when a filter process is performed using a filter where the Gaussian width $\sigma$ is one.

In the same manner, since the filter process was performed using the filter with the third order differential function $G_3$ where the Gaussian width $\sigma$ is one ($\sigma=1$), the images 142-1 to 142-4 are each images when a filter process is performed using a filter where the Gaussian width $\sigma$ is one.

However, the images 142-1 to 142-4 are images where the filter process was performed on the image 132. The image 132 is an image where the image 131 has been reduced in size.

In such a case, it is possible for the images 142-1 to 142-4 to be made to be images which correspond to images generated as a result of a filter process being performed using a filter with a third order differential function $G_3$ where the Gaussian width $\sigma$ is two ($\sigma=2$).

In order words, the images 142-1 to 142-4 are images which correspond to images which are generated when a filter process is performed using a filter with a third order differential function $G_3$ where the Gaussian width $\sigma$ is two ($\sigma=2$) with regard to the image 131.

That is, by performing a filter process with regard to the image pyramid, it is possible to obtain the same images when the filter process has been performed using filters with different Gaussian widths.

For example, compared to the calculation quantity and processing burden when a filter is prepared in advance for each Gaussian width and a filter process are performed, the calculation quantity and processing burden are significantly reduced when a filter with one Gaussian width is prepared in advance and a filter process are performed on an image pyramid as described above.

That is, by generating an image pyramid and performing a filter process with one Gaussian width, it is possible to significantly reduce the processing time.

As such, using such a method, in a case where a target object such as a person is to be detected from an image, by reducing the processing time, it is possible to detect the target object in the image in real time.

In this manner, the contour feature quantity calculation section 85 generates an image obtained by further averaging a plurality of images which correspond to when a filter process has been performed using filters where the Gaussian widths $\sigma$ are different. From the averaged image which is generated, it is possible to confirm contours of a person, and contours of a person are able to be appropriately extracted from an image using a filter process using each filter.

Recognition Process

Next, a recognition process of the first recognition section 62 and the second recognition section 63 where a target object is recognized will be described with reference to FIGS. 9 to 13.

Here, the recognition process of the first recognition section 62 where a hand is the recognition target object and the recognition process of the second recognition section 63 where a person is the recognition target object are only different in terms of their recognition target objects, and since the processes are the same, in order for simplification, only the recognition process of the second recognition section 63 where a person is the recognition target object will be described.

Figure 9:
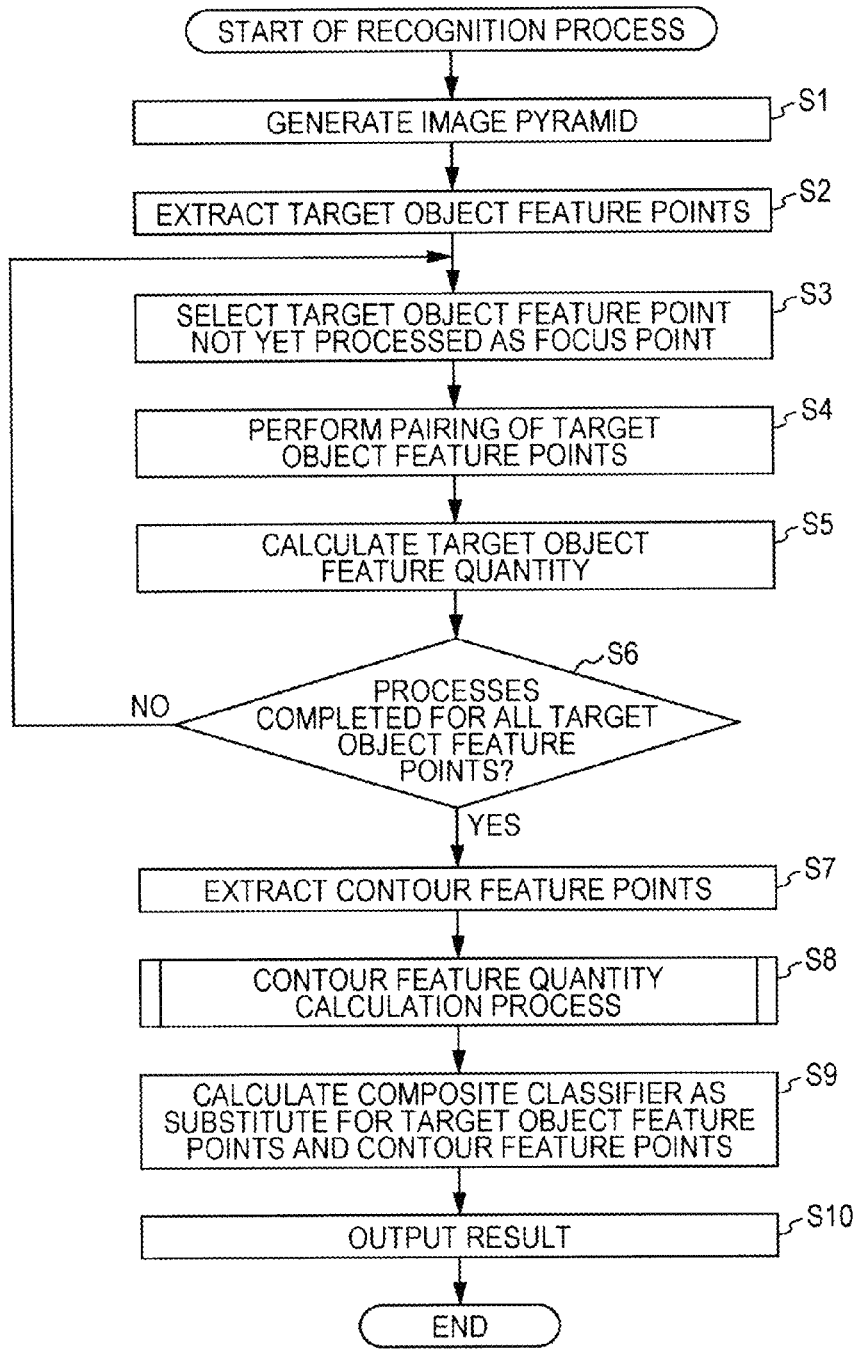
FIG. 9 is a flow chart describing a recognition process.

FIG. 9 is a flow chart describing a recognition process. The process in FIG. 9 is executed when an image is obtained using the camera 46A.

In step S1, the image pyramid generating section 81 in the second recognition section 63 generates an image pyramid from the image obtained using the camera 46A.

As described above, the image pyramid generating section 81 generates the image pyramid, for example, with layers of eight resolutions from level 1 to level 8.

Each of the target object feature point extraction section 82 and the contour feature point extraction section 84 execute the process of step S2 onward with one image out of the supplied image pyramid (a plurality of images with different resolutions) as the process target image and executes the process of step S2 onward repeatedly for each of the plurality of images.

In step S2, the target object feature point extraction section 82 extracts the target object feature points from the image which is the process target.

In step S3, the target object feature quantity calculation section 83 selects one of the target object feature points which have not yet been processed as a focus point from the target object feature points extracted in step S2.

In step S4, the target object feature quantity calculation section 83 performs pairing of the target object feature points with regard to each target object feature point based on the target object feature points extracted by the target object feature point extraction section 82 and the image.

In step S5, the target object feature quantity calculation section 83 calculates the target object feature quantity with regard to each pair of the target object feature points which were paired due to the pairing.

Figure 10:
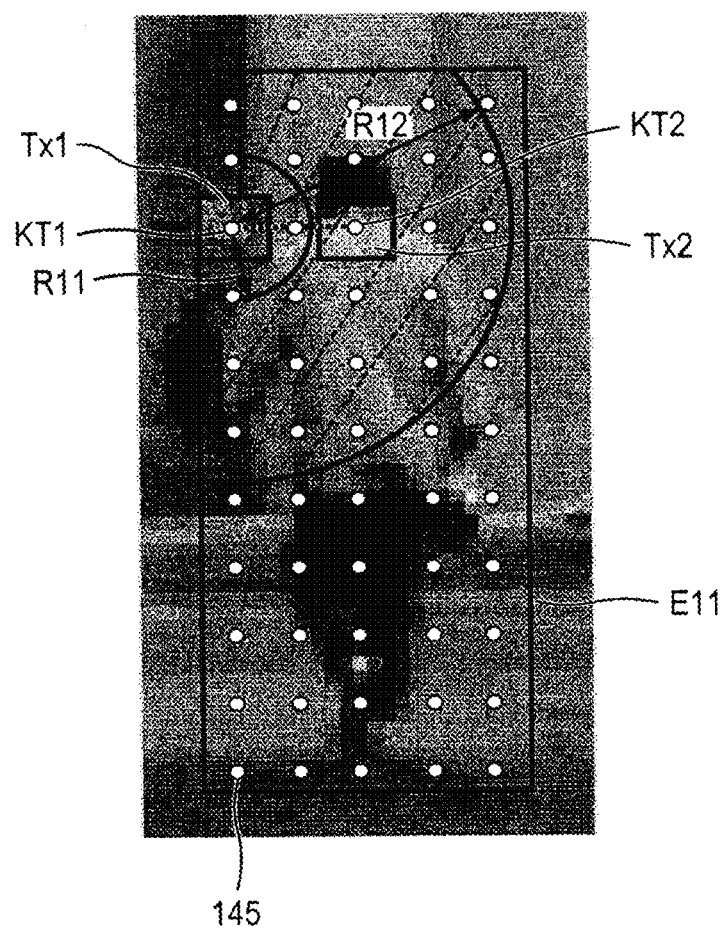
FIG. 10 is a diagram describing about extraction of target object feature points.

For example, in a case where the image shown in FIG. 10 is the target of the process using the target object feature point extraction section 82, the target object feature point extraction section 82 extracts target object feature points 145 from the image based on a margin determined in advance and a sampling skip number.

Here, in FIG. 10, the circles on the image show pixels which are target object feature points 145. In addition, for convenience, the reference numeral is only attached to one circle on the image.

Here, the margin is the number of pixels in the image from the edge of the image to the target region for the extraction of the target object feature points 145. In addition, the sampling skip number is an interval from pixel to pixel which are target object feature points 145 in the image.

Accordingly, for example, in a case where the margin is five pixels and the sampling skip number is five pixels, the target object feature point extraction section 82 excludes the region formed from pixels in positions five or less pixels from the edge of the image and a region E11 which remains at the inner side thereof is the target for the extraction of the target object feature points.

Then, the target object feature point extraction section 82 extracts the pixels in positions, which are separated from each other by only five pixels, out of the pixels in the region E11 as the target object feature points 145.

That is, the distance between the target object feature points 145 adjacent to each other in the vertical direction or the horizontal direction in FIG. 10 is five pixels, and each of the target object feature points 145 are pixels inside the region E11 (processes of S2 and S3).

Next, the target object feature quantity calculation section 83 performs pairing of each of the target object feature points 145 based on a minimum radius and a maximum radius determined in advance.

For example, in a case where the minimum radius is R11 and the maximum radius is R12, when focusing on a predetermined target object feature point KT1, the target object feature quantity calculation section 83 makes one pair out of the target object feature point 145 and the target object feature point KT1 with regard to all of the target object feature points 145 where the distance from the target object feature point KT1 is equal to or more than the minimum radius R11 and equal to or less than the maximum radius R12.

For example, in a case where there are N target object feature points 145 where the distance from the target object feature point KT1 is equal to or more than the minimum radius R11 and equal to or less than the maximum radius R12, N pairs of the target object feature points 145 are obtained.

The target object feature quantity calculation section 83 perform pairing of the other target object feature points 145 with regard to all of the target object feature points 145 (process of step S4).

Further, the target object feature quantity calculation section 83 calculates the texture distances of regions with the same shape and same size, which are centered on each target object feature point 145 which forms a pair, as the target object feature quantity with regard to each of the pairs of the target object feature points 145 obtained due to pairing.

For example, in a case where the target object feature quantity with regard to a pair of the target object feature point KT1 and a target object feature point KT2 shown in FIG. 10 is determined using SSD (Sum of Square Distance), the target object feature quantity calculation section 83 sets a predetermined region which is centered on the target object feature point KT1 as a region Tx1 and sets a region which is centered on the target object feature point KT2 and is the same size as the region Tx1 as a region Tx2.

Then, the target object feature quantity calculation section 83 determines the total absolute value of the differences of the pixel values of the pixels in the region Tx1 and the pixel values of the pixels in the region Tx2 which corresponds to the pixels and the total absolute value of the determined differences is the target object feature quantity.

Here, the target object feature quantity is not limited to SSD and may be SAD (Sum of Absolute Distance), a normalized correlation, or the like (process of step S5).

Returning to FIG. 9, in step S6, the target object feature quantity calculation section 83 determines whether the processes have been completed with regard to all of the target object feature points.

In a case where it is determined in step S6 that the processes have not yet been completed with regard to all of the target object feature points 145, the process returns to step S3, the next target object feature point 145 is selected as the focus point, and the same process is executed.

On the other hand, in a case where it is determined in step S6 that the processes have been completed with regard to all of the target object feature points 145, the process proceeds to step S7.

In step S7, the contour feature point extraction section 84 extracts contour feature points from the image which was generated in step S1 and is the process target.

Figure 11A:
FIGS. 11A and 11B are diagrams describing about extraction of contour feature points.
Figure 11B:
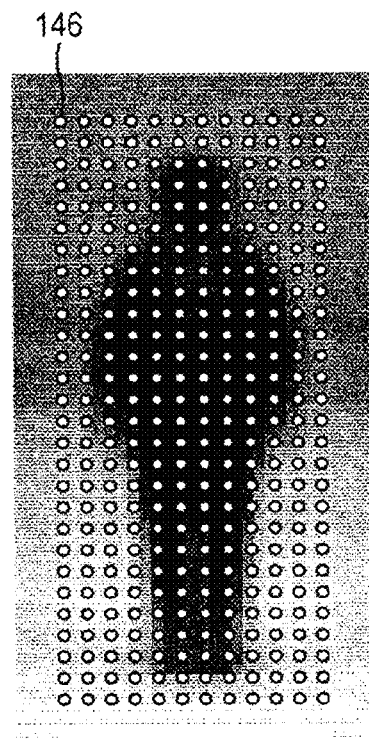

For example, in a case where the image shown in FIG. 11A is input in the contour feature point extraction section 84, the contour feature point extraction section 84 extracts pixels which are lined up in predetermined intervals in the image as contour feature points 146 as shown in FIG. 11B.

Here, in FIG. 11B, the circles on the image show pixels which are contour feature points 146. In addition, for convenience, the reference numeral is only attached to one circle on the image.

The image shown in FIG. 11B is an image formed from 32 pixels in the horizontal direction and 64 pixels in the vertical direction in the diagram. The contour feature point extraction section 84 selects pixels in the image as pixels which become the contour feature points 146 in every second pixel in the horizontal direction and the vertical direction.

According to this, 12 pixels in the horizontal direction and 28 pixels in the vertical direction for a total of 336 (=12×28) pixels are selected as the contour feature points 146.

When the contour feature points 146 are extracted from the image, the contour feature point extraction section 84 supplies the extracted contour feature points 146 and the input image to the contour feature quantity calculation section 85.

In step S8, the contour feature quantity calculation section 85 performs a contour feature quantity calculation process and calculates the contour feature quantity for each of the contour feature points 146 based on the contour feature points 146 and the image supplied from the contour feature point extraction section 84.

Contour Feature Quantity Calculation Process

Figure 12:
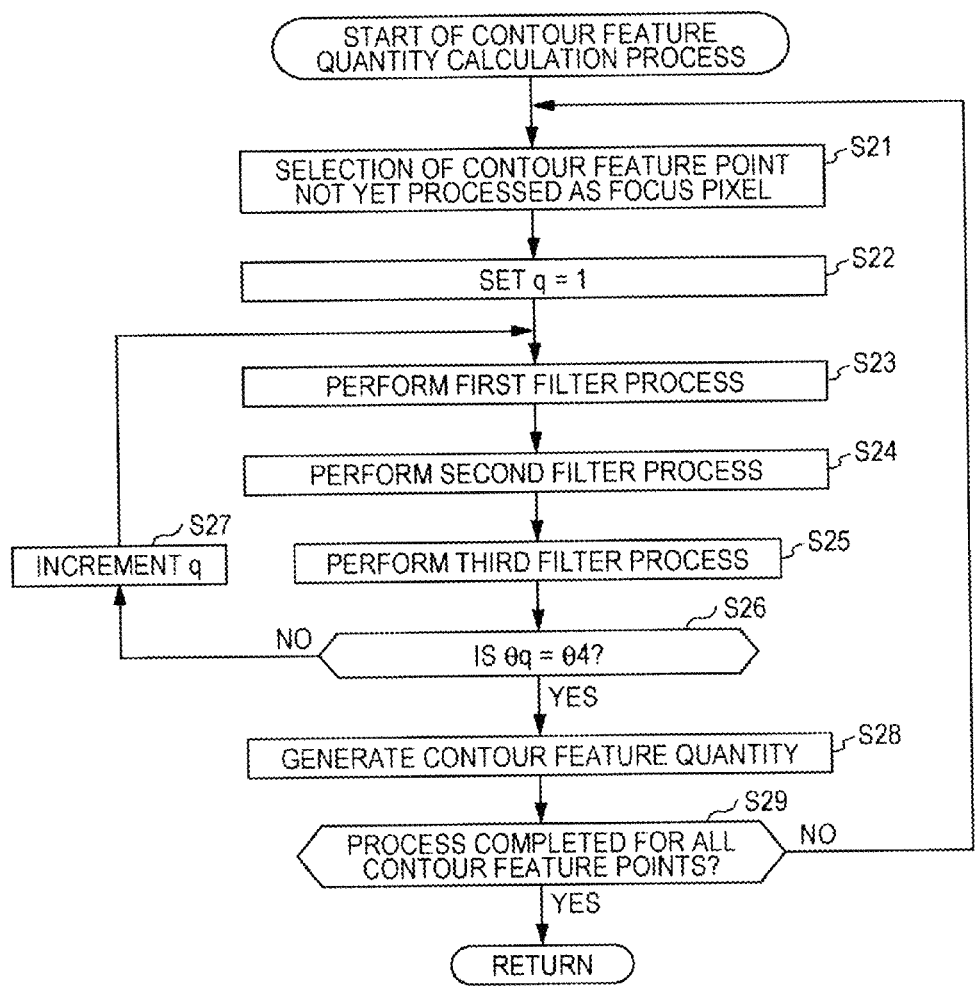
FIG. 12 is a flow chart describing a contour feature quantity calculation process.

Here, the contour feature quantity calculation process which corresponds to the process of step S8 in FIG. 9 will be described with reference to the flow chart in FIG. 12.

In step S21, the contour feature quantity calculation section 85, or in more detail, each of the first filter processing section 101, the second filter processing section 102, and the third filter processing section 103 of the contour feature quantity calculation section 85, select one of the contour feature points which have not yet been processed as a focus point from the contour feature points supplied from the contour feature point extraction section 84.

In step S22, the contour feature quantity calculation section 85 sets a counter q which indicates a direction $\theta q$ as one. Due to this, the direction $\theta q$ is set as a direction $\theta 1$.

In step S23, the first filter processing section 101 performs the first filter process.

That is, based on the pixel value of the focus pixel which is the process target, the first filter processing section 101 sets the Gaussian width so that $\sigma=1$, calculates equation (2) with the direction as $\theta q$, and supplies the result of the filter process to the feature quantity generating section 104.

That is, the calculation is performed and the contours are extracted with the direction $\theta$ in equation (2) is set as $\theta q$.

Here, "the Gaussian width is set so that $\sigma=1$" is written, but in the case of the embodiment, since the Gaussian width is fixed so that $\sigma=1$ (the filter with one Gaussian width is set in advance), it is possible to omit the process where "the Gaussian width is set so that $\sigma=1$".

That is, in the embodiment, the process, where equation (2) is calculated where the filter direction with the Gaussian width $\sigma$ of one is set as the direction $\theta q$, is executed in step S23.

In addition, here, the description where the Gaussian width $\sigma$ is set so that $\sigma=1$ will continue, but the Gaussian width of the filter prepared in advance may have a Gaussian width other than $\sigma=1$.

In step S24, the second filter processing section 102 performs the second filter process.

That is, based on the pixel value of the focus pixel, the second filter processing section 102 calculates equation (3) with the filter direction where the Gaussian width $\sigma$ of one is set as $\theta q$ and supplies the result of the filter process to the feature quantity generating section 104.

That is, the calculation is performed and the contours are extracted with the direction θ in equation (3) is set as θq.

In step S25, the third filter processing section 103 performs the third filter process.

That is, based on the pixel value of the focus pixel, the third filter processing section 103 calculates equation (5) with the filter direction where the Gaussian width σ of one is set as θq and supplies the result of the filter process to the feature quantity generating section 104.

That is, the calculation is performed and the contours are extracted with the direction θ in equation (5) is set as θq.

In step S26, the contour feature quantity calculation section 85 determines whether or not the direction θq is θ4, that is, whether or not the counter q is four. In a case where it is determined in step S26 that the direction θq is not θ4, in step S27, the contour feature quantity calculation section 85 increments the counter q.

For example, in a case where the counter q is one, the counter q is incremented by only one so that q=2, and due to this, the direction θq is θ2. When the counter q is incremented by only one, the process returns to step S23 and the processes above are repeated.

On the other hand, in a case where it is determined in step S26 that the direction θq is θ4, in step S28, the feature quantity generating section 104 combines the calculation results supplied from the first filter processing section 101, the second filter processing section 102, and the third filter processing section 103 as the contour feature point, and generates the contour feature quantity with regard to one contour feature point.

The contour feature quantity is determined by equation (7) or equation (8) below.

$$v_j = \sum_{x,y} |G_{d,\theta} \otimes I(x_i, y_i, s_i)| \quad (7)$$

$$v_j = \max_{x,y} |G_{d,\theta} \otimes I(x_i, y_i, s_i)| \quad (8)$$

In equation (7) and equation (8), similar to equation (2) and the like, $G_{d,\theta}$ is a function where a Gaussian function G with an arbitrary angle θ has been differentiated to the dth order. In addition, out of $I(x_i, y_i, s_i)$, $(x_i, y_i)$ represent coordinates in the image of the contour point which is the process target and $(s_i)$ represents the scale of the image which is the process target out of the images which configure the image pyramid.

Equation (7) is an equation where convolution calculation of the function, where the Gaussian function G with an arbitrary angle θ has been differentiated to the dth order, and the contour feature quantity is performed and calculation of the total of the absolute values is performed using Σ. Equation (8) is an equation where convolution calculation of the function where the Gaussian function G with an arbitrary angle θ has been differentiated to the dth order and the contour feature quantity is performed and a maximum value of the absolute values is obtained using max.

Both equation (7) and equation (8) are equations where the feature quantity is calculated, but equation (7) is an equation which calculates local energy and the equation (8) is an equation which calculates a local maximum value. Here, there will be additional description of the meanings of the equations.

Using the processes described above, it is possible to generate a detection and classification device which detects target object such as people with a filter coefficient extracted from a function with an arbitrary angle and a scale as the feature quantity.

However, for example, in the detection and classification device, the feature points may depend on the relationship between the clothes that the person is wearing and the background.

In addition, in relation to a recognition target where the changing of shape is considerable such as with people, the selectivity is excessive with regard to the feature quantities. As such, it is necessary to absorb this and perform the processes, and it is necessary to make each of the feature quantities into feature quantities which have invariance.

It is possible to solve the making of "the feature points which depend on the relationship between the clothes that the person is wearing and the background" into feature points which have invariance by calculating absolute values of the output values after the filter processes. By calculating the absolute values, it is possible to extract the feature points which are close to the contours of people.

Furthermore, in the embodiment, the first order differential function, the second order differential function, and the third order differential function are calculated, and calculation of the absolute value of each is performed. As such, compared to a case where calculation is performed using only the absolute value of the first order differential function, it is possible to significantly improve accuracy and it is possible to calculate feature quantities which have invariance.

In addition, with regard to "the selectivity being excessive with regard to the feature points in relation to a recognition target where the changing of shape is significant such as with people", by performing an invariant calculation using positional deviation, it is possible to calculate feature quantities which absorb this.

The invariant calculation using positional deviation is a calculation, for example, which uses that the lengths of the contours are substantially the same irrespective of the shape of a face when the contours of a face have been detected.

In other words, when focusing on a predetermined portion of the contour, it is a calculation that even if the position of the portion deviates such as when the position of the contours of a person with a substantially round face moves and overlaps with the contours of a person with a narrow and long face, a value such as the length does not change due to only deviation of the position.

As such a calculation, the total is calculated such as in equation (7). By calculating the total, for example, the total of the contours of the face of the person is calculated.

In addition, the maximum value is calculated in equation (8). By calculating the maximum value, for example, the maximum value out of the contours of the face of the person is calculated.

Here, the two calculations of the total and the maximum value are shown. In other words, as described above, the calculation where the local energy is calculated is shown based on equation (7) and the calculation where the local maximum value is calculated is shown based on equation (8).

Other than these calculations, a calculation may be performed where the local energy in the vicinity of a point which has a local maximum value is calculated. This is an image where the calculation result of equation (8) is received and the calculation of equation (7) is performed.

In addition, a calculation may be performed where the maximum value in the vicinity of the local energy is calculated. This is an image where the calculation result of equation (7) is received and the calculation of equation (8) is performed. Although a detailed equation is not shown, the feature quantity may be calculated using a calculation such as this.

Using such a calculation, the feature quantity is calculated from each of the contour feature points. Then, in step S29, the contour feature quantity calculation section 85 determines whether or not the process has been completed with regard to all of the contour feature points.

For example, in a case where the contour feature quantities have been determined in regard to all of the feature points supplied from the contour feature point extraction section 84, it is determined that the process has been completed.

In a case where it is determined in step S29 that the process has not been completed in regard to all of the contour feature points, the process returns to step S21 and the next contour feature point is selected as the focus pixel.

On the other hand, in a case where it is determined in step S29 that the process has been completed in regard to all of the contour feature points, the process proceeds to step S9 in FIG. 9.

In step S9, the classification calculation section 86 reads out the feature quantity for classification and the composite classifier stored in advance in the storage section 48 and calculates the read-out composite classifier as a substitute for the feature quantity.

That is, as a substitute for the read-out composite classifier, the classification calculation section 86 performs calculation of a correspondence to the feature quantity for classification out of the target object feature quantity from the target object feature quantity calculation section 83 or the contour feature quantity from the contour feature quantity calculation section 85.

Here, the feature quantity which is the feature quantity for classification is a feature quantity used in the setting of weak classifiers which configure the composite classifier during a statistical learning process. That is, it is the target object feature quantity of a pair of target object feature points which correspond to a predetermined number of weak classifiers with a comparatively low error rate and contour feature quantities of the contour feature points.

In addition, the composite classifier is generated by integrating the target object classifier and the contour classifier. The target object classifier is a classifier which identifies whether the target object is included in the image using the target object feature quantity. The contour classifier is a classifier which identifies whether the target object is included in the image using the contour feature quantity.

In a case where the target object feature quantity of a pair of corresponding target object feature points is substituted, the predetermined number of weak classifiers output "+1" when the result is positive and output "−1" when the result is negative. Also, the target object classifier outputs whether or not the target object which is to be recognized is present depending on what is determined by the majority of the predetermined number of weak classifiers.

In the same manner, the contour classifier also substitutes the contour feature quantities of the contour feature points with the weak classifiers and outputs whether or not the target object which is to be recognized is present depending on what is determined by the majority of the predetermined number of weak classifiers.

Specifically, the composite classifier is generated as follows.

First, equation (9) is calculated and a classifier total U(x) of a target object classifier R(x) and a contour classifier T(x) is determined. That is, the classifier total U(x) is determined using a linear combination of the target object classifier R(x) and the contour classifier T(x).

$$U(x) = \alpha \cdot R(x) + \beta \cdot T(x) \tag{9}$$

Here, in equation (9), $\alpha$ and $\beta$ are predetermined constants, that is, tuning parameters, and are determined by, for example, a classification rate or the like with regard to a learning image used in a statistical learning process.

The composite classifier shown using equation (10) is generated using the determined classifier total U(x).

$$\text{COMPOSITE CLASSIFIER} = \text{sign}(U(x)) \tag{10}$$

As a result of the calculation when the calculation of equation (10) is performed, "+1" is obtained which shows that the person which is the target object is present in the input image or "−1" is obtained which shows that the person which is the target object is not present in the input image. The classification calculation section 86 supplies the calculation result of the composite classifier to the recognition result output section 87.

In step S10, the recognition result output section 87 outputs the recognition result in regard to the person based on the calculation result from the classification calculation section 86 and the process is completed. That is, the recognition result of whether or not the target object is recognized in the image is output.

Here, it is described above that a person is detected as the target object, but the target object is not limited to a person and may be any object.

Figure 13:
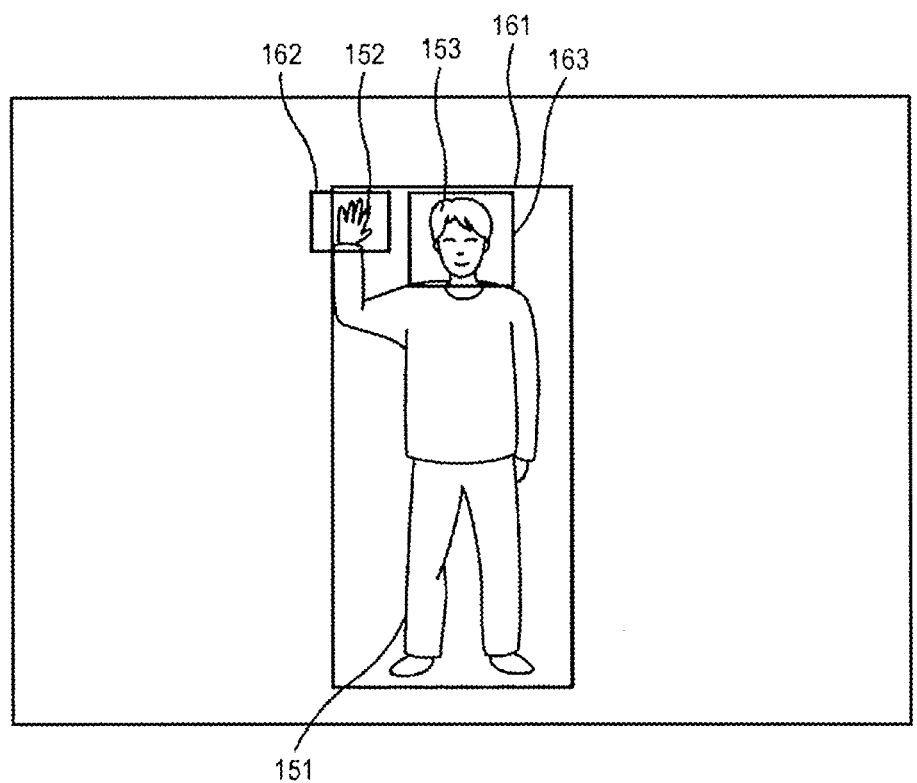
FIG. 13 is a diagram illustrating an example of a recognition result.

For example, as the classification result of whether or not the target object is recognized in the input image, the region where a person, a hand, or a face which is the target object is detect may be set in a frame and the displayed image may be displayed as shown in FIG. 13.

The image shown in FIG. 13 is an image where a person 151, a hand 152, and a face 153 are displayed as the target objects, and in the image, a person recognition frame 161 which encompasses the person 151, a hand recognition frame 162 which encompasses the hand 152, and a face recognition frame 163 which encompasses the face 153 are set and displayed.

In a case where a display such as this is performed, the image is input also into the recognition result output section 87 and the classification calculation section 86 supplies information, which indicates a region where the target object of the input image, to the recognition result output section 87 along with the calculation result.

In a case where the target object is detected from the image based on the calculation result and the information which indicates the region from the classification calculation section 86, the recognition result output section 87 sets a frame (for example, the person recognition frame 161) which encompasses the region where the target object (for example, the person 151) is detected and displays the frame in the display 47A along with the image.

In this manner, the second recognition section 63 extracts the target object feature points from the image and determines the target object feature quantities of the pairs of the target object feature points as well as extracting the contour feature points from the image and determining the contour feature quantities.

Then, the second recognition section 63 detects a person as the target object from the image using the determined target object feature quantity and contour feature quantity and the composite classifier which is stored in advance in the storage section 48.

As above, the second recognition section 63 recognizes a person as the target object. The process where the first recognition section 62 recognizes a hand as the target object is also similar to the process by the second recognition section 63 and only the target object is different. Since there will be repetition, the description thereof is omitted.

Target Object Recognition Process 1

Next, an example of a process, where a target object is recognized using the two recognition units of the first recognition section 62 and the second recognition section 63, will be described with reference to FIGS. 14 to 19. Here, the number of recognition devices is not limited to two and a plurality of three or more recognition devices may be used.

Figure 14:
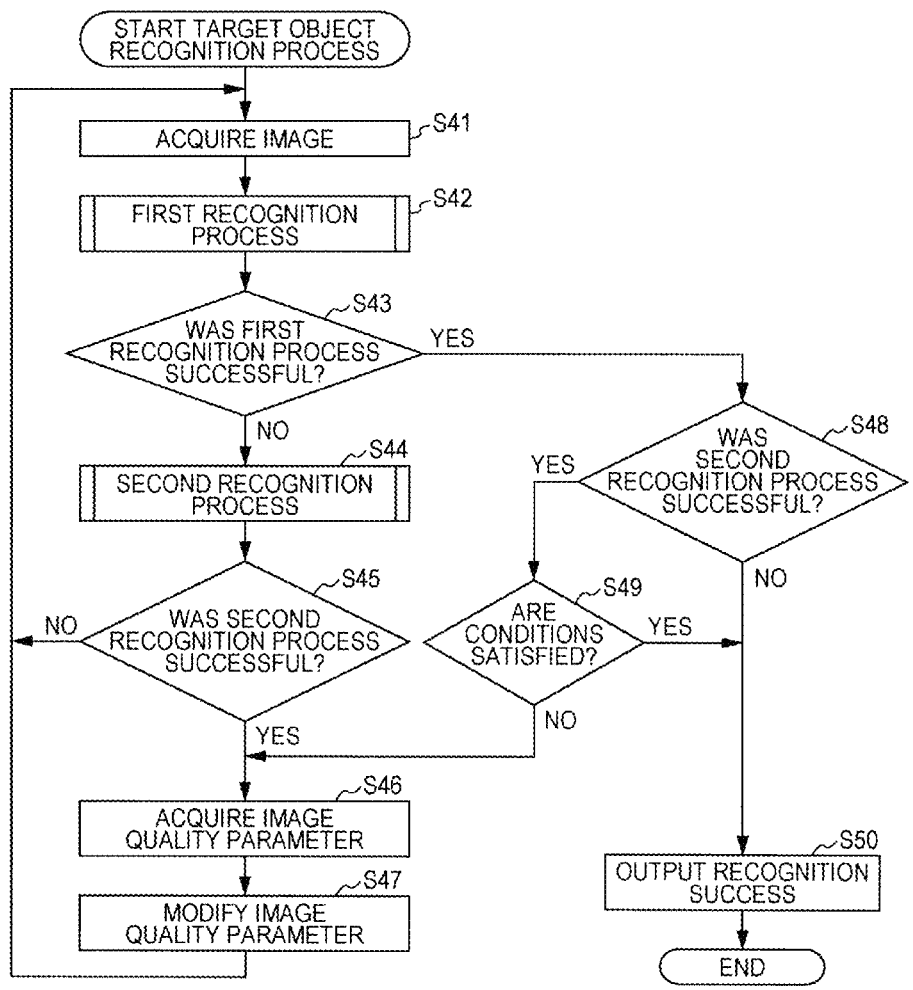
FIG. 14 is a flow chart describing a target object recognition process.

FIG. 14 is a flow chart describing a target object recognition process. In the example in FIG. 14, the first recognition section 62 recognizes a hand as the target object and the second recognition section 63 recognizes a person as the target object.

In step S41, the acquisition section 61 acquires an image from the camera 46A which configures the input section 46. For example, an image is acquired which is shown in FIG. 15A where a person 151-1 is raising a hand 152-1.

In step S42, the first recognition section 62 performs the first recognition process with regard to the acquired image. That is, a process is executed where the hand from the image in FIG. 15A is recognized. The details of the process are as described above.

Figure 15A:
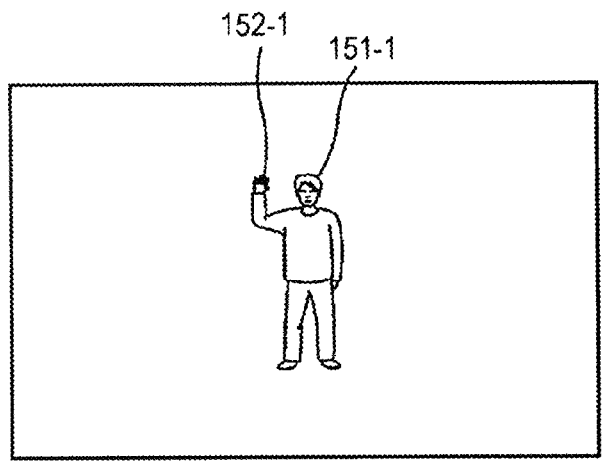
FIGS. 15A to 15C are diagrams illustrating examples of recognition results.

In the image in FIG. 15A, the person 151-1 is standing in a location which is separated from the camera 46A. In such a case, it is difficult to recognize the hand 152-1 from the image in FIG. 15A in the first recognition process in step S42 since the hand 152-1 is small.

In step S43, the determination section 64 determines whether the first recognition process was successful. That is, it is determined whether it was possible to recognize the hand 152-1 from the image in FIG. 15A.

In a case where it is determined in step S43 that the first recognition process has failed, that is, in a case where it was not possible to recognize the hand, the process proceeds to step S44.

In step S44, the second recognition section 63 performs the second recognition process with regard to the acquired image. That is, a process is executed where the person is recognized with regard to the image in FIG. 15A. The details of the process are as described above.

In the image in FIG. 15A, the person 151-1 is standing in a location which is separated from the camera. However, the size of the person 151-1 is larger than the hand 152-1 and is a size which is sufficient to be recognized. An image is shown in FIG. 15B when the person 151-1 is recognized in the second recognition process in step S44.

Figure 15B:
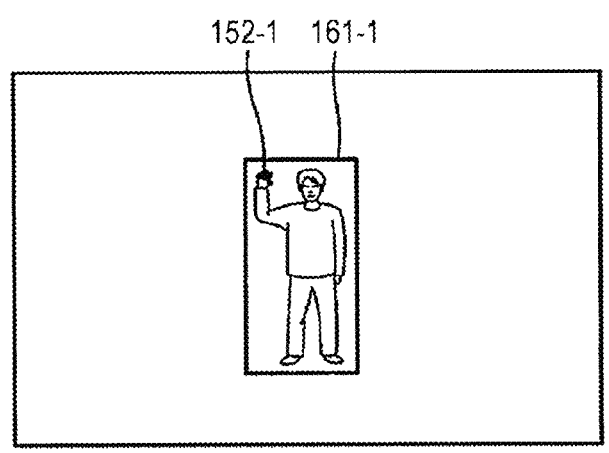

FIG. 15B is a diagram which shows an example of an image when the person 151-1 is recognized. The person 151-1 is recognized using the second recognition section 63, a person recognition frame 161-1 is set and displayed.

In step S45, the determination section 64 determines whether the second recognition process was successful. That is, it is determined whether it was possible to recognize the person 151-1 from the image in FIG. 15A.

In a case where it is determined in step S45 that the second recognition process has failed, the process returns to step S41. That is, in a case where both the first recognition process and the second recognition process have failed, the processes from step S41 to step S45 are repeated.

In a case where it is determined in step S45 that the second recognition process was successful, that is, in a case where it was possible to recognize the person 151-1 as in the example of FIG. 15B, that is, in a case where the hand recognition process failed but the person recognition process was successful, the process proceeds to step S46.

In step S46, the acquisition section 61 acquires an image quality parameter from the storage section 48. It is possible to classify the image quality parameter into a camera control parameter or an image processing parameter.

A camera control parameter is, for example, a parameter which sets a setting value of the main body of a camera such as zoom ratio, a focus position, an aperture value, a shutter time, a gain value, a color adjustment value, camera direction, or the like. An image processing parameter is, for example, a parameter for processing an acquired image such as brightness, contrast, color conversion, a sharpness value, focus, digital zoom ratio, or the like.

At least one type out of the camera control parameters and the image processing parameters is stored in the storage section 48 in advance as the image quality parameter. The setting values of the image quality parameter which are stored in the storage section 48 are separately prepared.

For example, in a case where the zoom ratio is set as the image quality parameter and P (where P is a natural number) setting values are prepared, the zoom ratio is stored as zoom ratio a={a1, a2, ..., aP}. The acquisition section 61 acquires a new setting value from among {a1, a2, ..., aP} as the image quality parameter.

Here, for example, in a case where brightness b={b1, b2, ..., bQ (where Q is a natural number)} is set as the image quality parameter in addition to the zoom ratio a, it is possible to provide a combination of the setting values of the zoom ratio a and the brightness b as the image quality parameter.

In addition, a case where there are three or more types of the image quality parameters is the same. Then, the method is valid where all of the combinations are tried until the image is recognized.

In step S47, the control section 65 controls the current image quality parameter so as to be changed to the new image quality parameter acquired in step S46. After the process of step S47, the process returns to step S41.

Here, instead of the image quality parameter, an instruction such as "please move closer to the camera" may be acquired and displayed in the display 47A with regard to the user.

Until it is determined in step S43 that the first recognition process was successful, the process from step S41 to S47 is repeated.

In the process of step S41 which follows the process of step S47, the acquisition section 61 acquires an image where the image quality parameter has been changed in step S47. An image, where the image quality parameter has been changed and which is appropriate for recognizing the hand, will be described with reference to FIG. 15C.

Figure 15C:
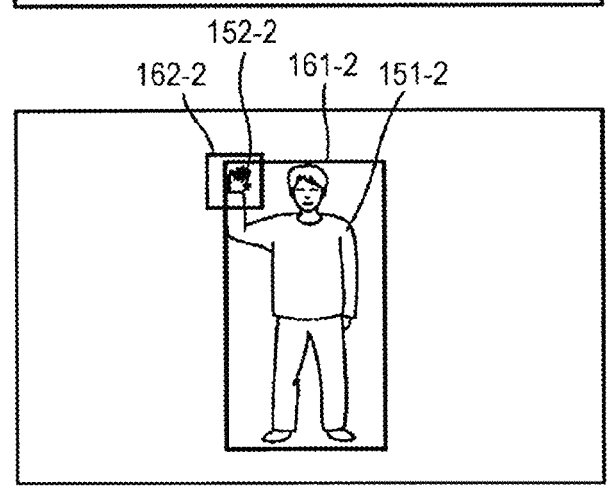

FIG. 15C is a diagram which shows an image where the zoom ratio which is the image quality parameter has been changed. In FIG. 15C, an example is shown of a case where the image quality parameter is changed so that the zoom ratio is set so the camera looks further into the distance. That is, the person 151-2 is displayed to be larger in the image.

In step S42, the first recognition section 62 executes the first recognition process. In the image of FIG. 15C where the image quality parameter has been changed, the size of the hand 152-2 is a size which is larger than the case shown in FIG. 15A and which is sufficient to be recognized. Accordingly, in the process of step S42, the hand 152-2 is recognized using the first recognition section 62 and a hand recognition frame 162-2 is set and displayed.

In a case where it is determined in step S43 that the first recognition process was successful, that is, in a case where it was possible to recognize the hand, the process proceeds to step S48.

In step S48, the determination section 64 determines whether the second recognition process in step S44 was successful. That is, it is determined whether the process of recognizing the hand was successful.

In a case where it is determined in step S48 that the second recognition process was successful, the process proceeds to step S49, and in step S49, the determination section 64 determines whether a condition has been satisfied.

The condition is two conditions of a relative positional relationship and a relative size relationship. First, the relative positional relationship condition will be described with reference to FIGS. 16A to 17B.

Figure 16A:
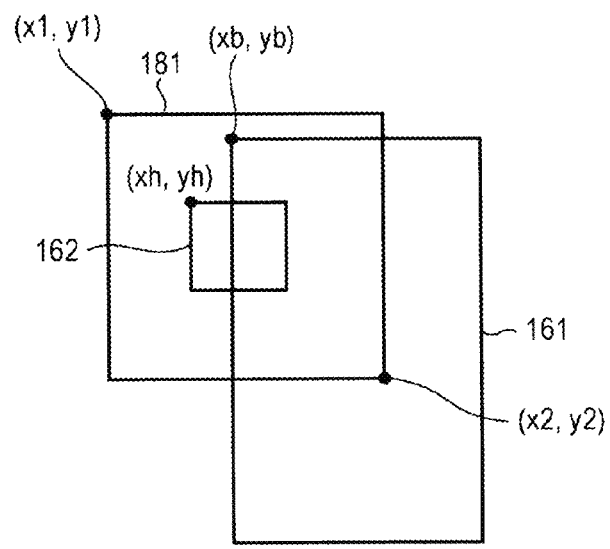
FIGS. 16A and 16B are diagrams illustrating examples of relative position conditions.

FIG. 16A is a diagram which shows an example of a relative positional relationship of a person recognition frame 161 and a hand recognition frame 162. A detection region 181 is set in advance in a predetermined position of the person recognition frame 161. Then, as the condition, it is determined whether the hand recognition frame 162 is in the detection region 181 using the determination section 64.

Specifically, for example, the coordinates (x1, y1) of the farthest to the upper left of the detection region 181 and the coordinates (x2, y2) of the farthest to the lower right of the detection region 181 are set in advance so as to be in a predetermined relationship with regard to the coordinates (xb, yb) of the farthest to the upper left of the person recognition frame 161.

In this case, the determination section 64 determines whether the coordinates (xh, yh) of the farthest to the upper left of the hand recognition frame 162 satisfy the following equation.

$$\begin{cases} x_1 \leq x_h \leq x_2 \\ y_1 \leq y_h \leq y_2 \end{cases} \quad (11)$$

Figure 16B:
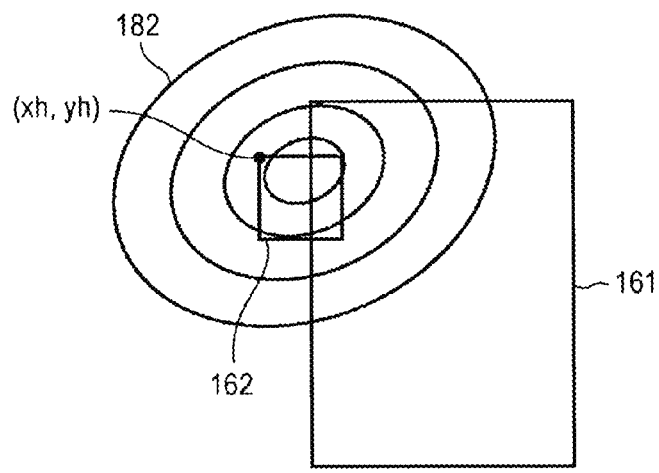

FIG. 16B is a diagram which shows another example of a relative positional relationship of the person recognition frame 161 and the hand recognition frame 162. A detection region 182 is set based on the distribution of the relative position of the hand recognition frame 162 in regard to the person recognition frame 161.

Specifically, when considering a two-dimensional normal distribution which is defined by averages $\mu_{x,y}$ and a covariance $\Sigma_{xy}$ of the coordinates (xh, yh) of the position of the hand, a predetermined range is specified where the value of the covariance $\Sigma_{xy}$ is equal to or greater than a threshold w0.

That is, when the coordinates (xh, yh) of the farthest to the upper left of the hand recognition frame 162 are acquired, the determination section 64 determines whether the coordinates (xh, yh) satisfy the following equation. That is, it is determined whether the coordinates are positioned in a range of a predetermined distance from the averages $\mu_{x,y}$ of the xy plane.

TWO-DIMENSIONAL NORMAL DISTRIBUTION
$$w = N(x_h | \mu_{x,y}, \Sigma_{xy})$$

$$w > w0 \quad (12)$$

Here, in the example of FIG. 16, the coordinates (xh, yh) of the farthest to the upper left of the hand recognition frame 162 are set as the base coordinates but the base coordinates may be the farthest to another side, an edge, or the center of the hand recognition frame 162.

In addition, the two-dimensional normal distribution is used in the example of FIG. 16B but another probability distribution, such as a logistic distribution, a hyperbolic secant distribution, a Rayleigh distribution, a Levy distribution, or a Cauchy distribution, may be defined and used in the same manner.

Figure 17A:
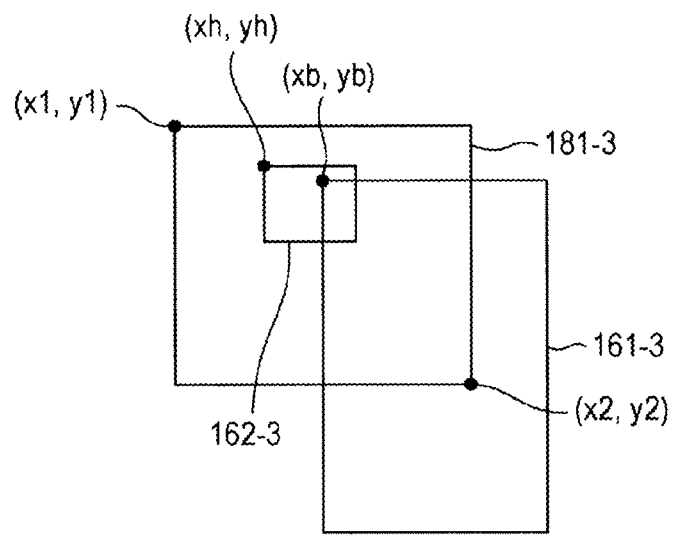
FIGS. 17A and 17B are diagrams illustrating examples of determination results of relative position conditions.

FIG. 17A is a diagram which shows an example of the relative positional relationship condition being satisfied. The coordinates (xh, yh) of the farthest to the upper left of the hand recognition frame 162-3 with regard to the coordinates (xb, yb) of the farthest to the upper left of the person recognition frame 161-3 are within the detection region 181-3. Accordingly, the determination section 64 determines that the relative positional relationship condition is satisfied.

Figure 17B:
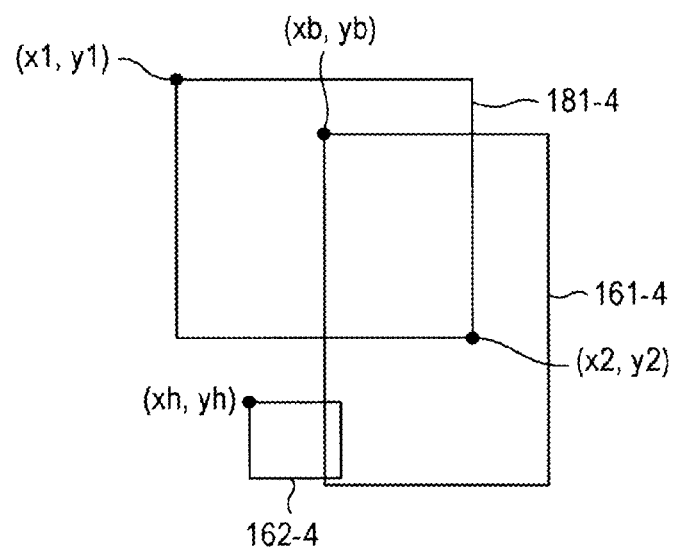

FIG. 17B is a diagram which shows an example of the relative positional relationship condition not being satisfied. As shown in FIG. 17B, the coordinates (xh, yh) of the farthest to the upper left of the hand recognition frame 162-4 are in a position to the lower left of the person recognition frame 161-4 which is outside of the range of the detection region 181-4.

In such a case, there is a high possibility that the recognition result is an erroneous recognition since, for example, the hand is positioned in the vicinity of a knee of the user. Accordingly, the determination section 64 determines that the relative positional relationship condition is not satisfied.

Figure 18A:
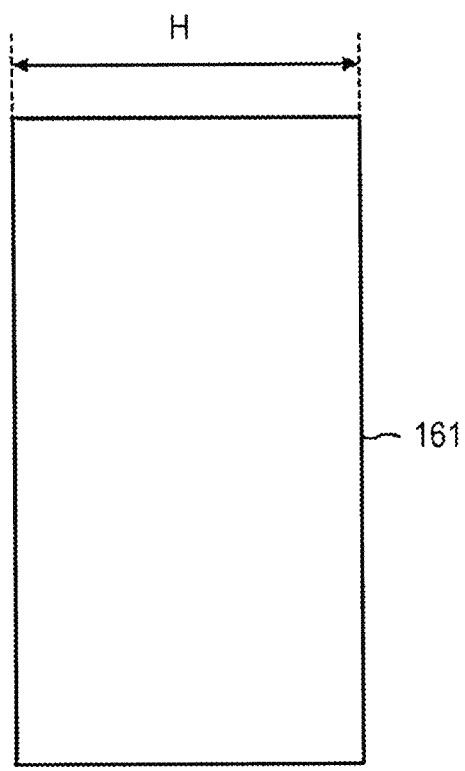
FIGS. 18A and 18B are diagrams illustrating examples of relative size comparison conditions.

Next, the relative size relationship condition will be described with reference to FIGS. 18A to 19B. FIG. 18A is a diagram which shows the size of the person recognition frame 161. In the example of FIG. 18A, the length of the width of the person recognition frame 161 is set as a size H of the person recognition frame 161.

Figure 18B:
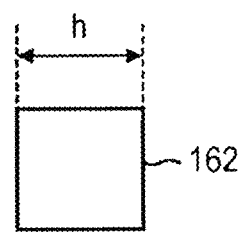

FIG. 18B is a diagram which shows the size of the hand recognition frame 162. In the example of FIG. 18B, the length of the width of the hand recognition frame 162 is set as a size h of the hand recognition frame 162.

Then, it is determined whether a ratio of the size H of the person recognition frame 161 and the size h of the hand recognition frame 162 is within a predetermined range which is set in advance.

Specifically, the determination section 64 determines whether the following equation is satisfied.

$$a_1 < \frac{h}{H} < a_2 \, (0 < a_1, a_2 < 1, a_1, a_2 : \text{RATIONAL NUMBER}) \quad (13)$$

In addition, as another example, when considering a normal distribution which is defined by an average value $\mu s$ and a variance $\sigma^2$ in relation to a ratio s of the size h of the hand recognition frame 162 in regard to the size H of the person recognition frame 161, a predetermined range is specified where the value of the variance $\sigma^2$ is equal to or more than a threshold s0.

That is, when the size h of the hand recognition frame 162 size and the H of the person recognition frame 161 are acquired, the determination section 64 determines whether the following equation is satisfied. That is, it is determined whether the variance $\sigma^2$ of the ratio s with regard to the size h of the hand recognition frame 162 and the size H of the person recognition frame 161 which are detected is equal to or more than the threshold s0, that is, whether the ratio s is within a predetermined range from the average $\mu s$.

$$\text{NORMAL DISTRIBUTION } s = N\left(\frac{h}{H}\,\middle|\,\mu_s, \sigma^2\right) \quad (14)$$

$$s > s0$$

Figure 19A:
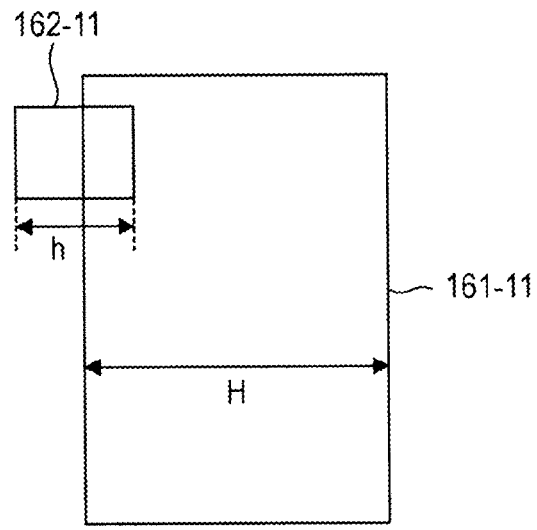
FIGS. 19A and 19B are diagrams illustrating examples of determination results of relative size comparison conditions.

FIG. 19A is a diagram which shows an example of the relative size relationship condition being satisfied.

In a case where the ratio of the size h of the hand recognition frame 162-11 with regard to the size H of the person recognition frame 161-11 is within a range which is set in advance, that is, in a case where the size h of the hand recognition frame 162-11 is an appropriate size with regard to the size H of the person recognition frame 161-11, the determination section 64 determines whether the relative size relationship condition is satisfied.

Figure 19B:
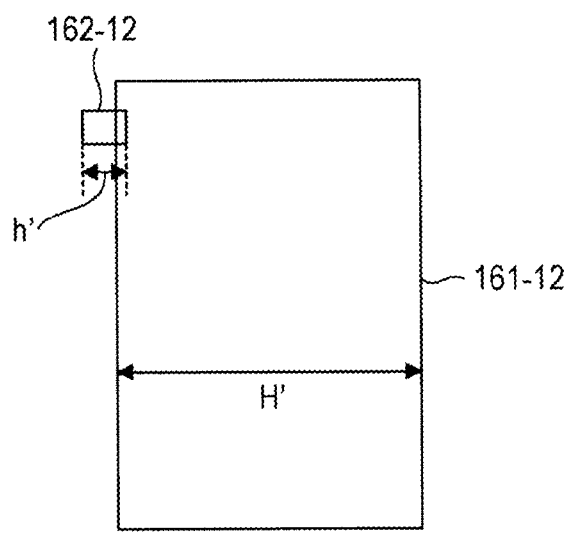

FIG. 19B is a diagram which shows an example of the relative size relationship condition not being satisfied. As shown in FIG. 19B, the size h' of the hand recognition frame 162-12 is too small compared to the size H' of the person recognition frame 161-12.

In such a case, since there is a high possibility that the recognition result of the hand or the person is an erroneous recognition, the determination section 64 determines that the relative size relationship condition is not satisfied. According to this, it is possible to more accurately recognize the target object.

Here, the two conditions of the relative positional relationship and the relative size relationship are described as the condition. However, the determination may be performed with the two conditions combined.

That is, equation (12) and equation (13) may be combined and the determination section 64 determines whether the following equation is satisfied.

$$z = ws$$

$$z > z0 \quad (15)$$

Returning to FIG. 14, in a case where it is determined in step S49 that the condition is not satisfied, the process proceeds to step S46. That is, in a case where it is determined that the condition is not satisfied even if both of the hand and the person are recognized, the image quality parameter is acquired and the recognition process is performed from a new image.

In a case where it is determined in step S49 that the condition is satisfied, that is, in a case where both the hand and the person are recognized and the condition is also satisfied, the process proceeds to step S50.

In addition, also in a case where it is determined in step S48 that the second recognition process was not successful, that is, in a case where the hand was recognized but it was not possible to recognize the person from the image which was initially acquired in step S41 and where the image quality parameter has not been changed, the process proceeds to step S50.

In step S50, the output section 66 outputs the recognition success. For example, the output section 66 outputs the recognition success to the application execution section 67.

The application execution section 67 executes a predetermined application when there is notification of the recognition success from the output section 66. For example, a command is executed based on gesture recognition using the application execution section 67.

After the process of step S50, the target object recognition process of FIG. 14 ends.

In this manner, by using the two recognition devices for recognition of each of the hand and the person, it is possible to more reliably recognize a hand even in an image where recognition is difficult with a single recognition device which recognizes a hand.

Here, in the example in FIG. 14, the first recognition section 62 recognizes a hand as the recognition target object and the second recognition section 63 recognizes a person as the recognition target object. However, the recognition target objects of the first recognition section 62 and the second recognition section 63 are not limited to these recognition target objects.

Target Object Recognition Process 2

As another example of the target object recognition process according to the embodiment, an example of a case where the first recognition section 62 recognizes a face as the recognition target object and the second recognition section 63 recognizes a person as the recognition target object will be described with reference to FIGS. 14 and 20A to 20C. Here, description is simplified as the same process as in the example described with reference to FIGS. 14 and 15A to 15C is repeated.

Figure 20A:
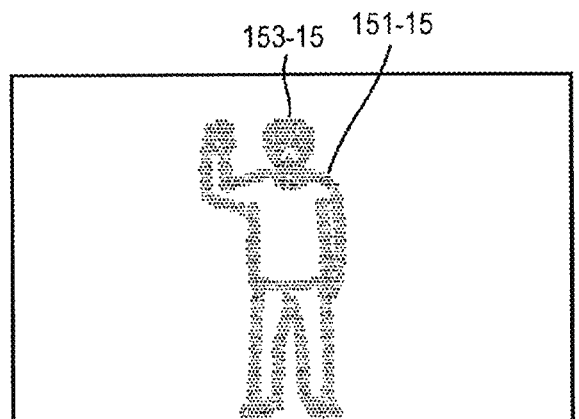
FIGS. 20A to 20C are diagrams illustrating examples of recognition results.

In step S41 of FIG. 14, the acquisition section 61 acquires the image in FIG. 20A. The image in FIG. 20A is a diagram which shows an example of an image which is out of focus.

In step S42, the first recognition section 62 performs the first recognition process with regard to the acquired image in FIG. 20A, that is, a process where a face is recognized. However, it is difficult for the face 153-15 to the recognized since the image in FIG. 20A is out of focus.

In step S43, the determination section 64 determines whether the first recognition process, that is, recognition of the face 153-15 was successful. It is determined in step S43 that the first recognition process has failed since it was not possible to recognize the face 153-15 in the image in FIG. 20A and the process proceeds to step S44.

In step S44, the second recognition section 63 performs the second recognition process with regard to the acquired image in FIG. 20A, that is, a process where a person is recognized. The image in FIG. 20A is out of focus but is an image which is sufficient for recognition of the person 151-15.

Figure 20B:
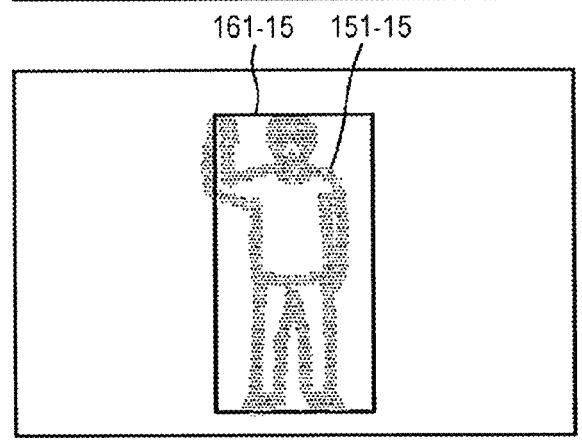

When the second recognition process is executed in step S44 and the person 151-15 is recognized, the person recognition frame 161-15 is set and displayed as shown in FIG. 20B.

In step S45, the determination section 64 determines whether the second recognition process was successful. In a case where the image in FIG. 20A was recognized, it is determined in step S45 that the second recognition process was successful and the process proceeds to step S46.

In step S46, the acquisition section 61 acquires a new image quality parameter. In the case of the example of FIGS. 20A to 20C, the focus position and the sharpness value are stored as the image quality parameter and a new setting value is acquired for the combination of the setting values of the focus position and the sharpness value.

In step S47, the control section 65 controls the current image quality parameter so as to be changed to the new image quality parameter acquired in step S46. After the process of step S47, the process returns to step S41.

Here, until it is determined in step S43 that the first recognition process was successful, the process from step S41 to S47 is repeated.

Figure 20C:
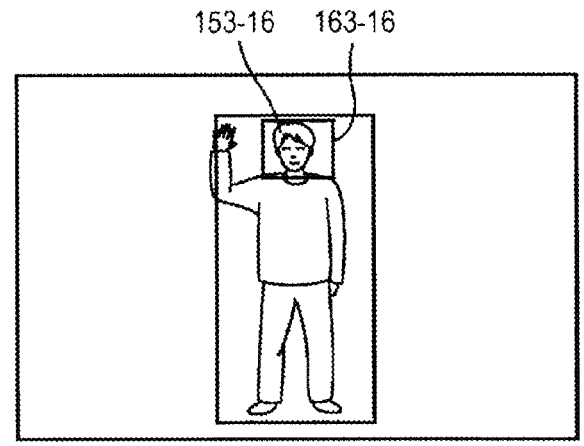

When an image which is appropriate for recognizing a face is acquired in step S41, the image in FIG. 20C is output by executing the first recognition process in step S42. When the face 153-16 is recognized in the process of step S42, the face recognition frame 163-16 is set and displayed.

Then, it is determined in step S43 that the first recognition process was successful and the process proceeds to step S48. The processes from S48 onward are the same as the example described with reference to FIGS. 14 to 19B and are omitted.

Here, in the case of the example of FIGS. 20A to 20C, when the recognition success is output in the process of step S50, the application execution section 67 executes an application which adjusts the focus and color so that it is possible display the face so that it is sharper and clearer. Of course, the focus may be changed as the image quality parameter.

Configuration of Posture Recognition Section

Figure 21:
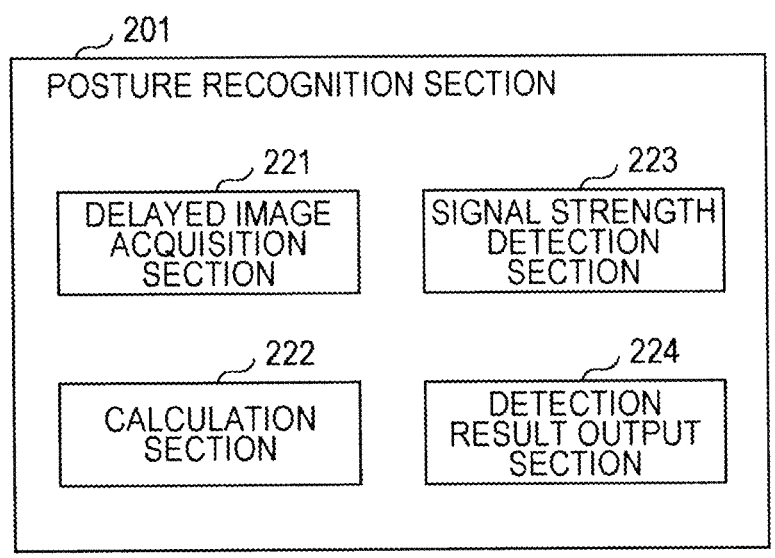
FIG. 21 is a block diagram illustrating a detailed configuration example of a posture recognition section.

It is possible to use the posture of a person in the determination of whether the condition is satisfied. FIG. 21 is a block diagram which shows a detailed configuration example of a posture recognition section 201 which is further include in the CPU 41 in such a case.

The posture recognition section 201 is configured from a delayed image acquisition section 221, a calculation section 222, a signal strength detection section 223, and a detection result output section 224.

The delayed image acquisition section 221 acquires an image which was stored a predetermined time beforehand in the RAM 43 or an image from a predetermined time beforehand which is supplied via a delay circuit which is not shown and the image is supplied to the calculation section 222.

The calculation section 222 calculates the difference between the original image and the delayed image and supplies the calculation result to the signal strength detection section 223. The signal strength detection section 223 detects a region where the signal strength is higher than a predetermined value and supplies the detection result to the detection result output section 224.

The detection result output section 224 overlaps and outputs the detection result on an image.

Target Object Recognition Process 3

Figure 22:
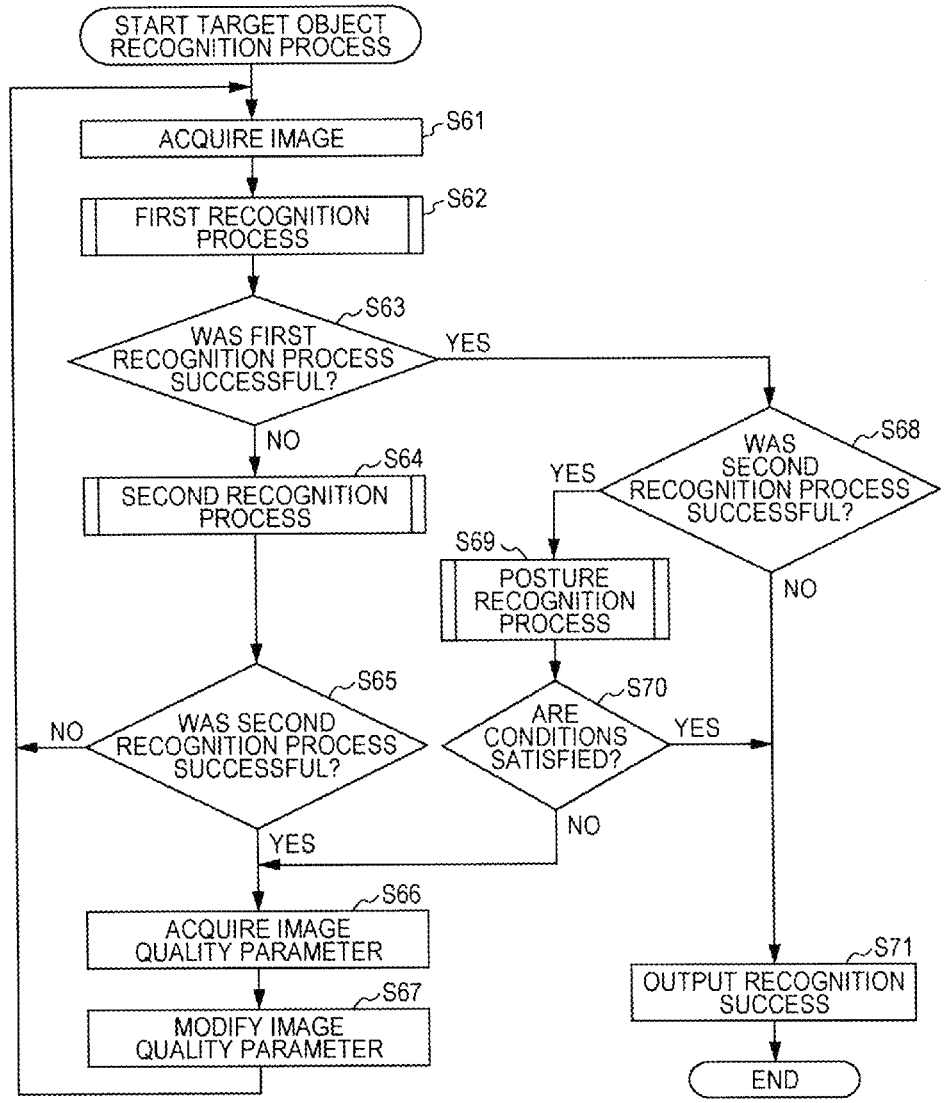
FIG. 22 is a flow chart describing an example of a target object recognition process.

Another example of the target object recognition process according to the embodiment will be shown with reference to FIGS. 22 to 26B. The processes of steps S61 to S68, S70 and S71 in FIG. 22 are processes which correspond to the processes of steps S41 to S50 in FIG. 14 and the description is simplified as the processes are repeated.

In the example of FIG. 22, an example is shown of a case where the first recognition section 62 recognizes a hand as the recognition target object and the second recognition section 63 recognizes a face as the recognition target object.

Figure 23A:
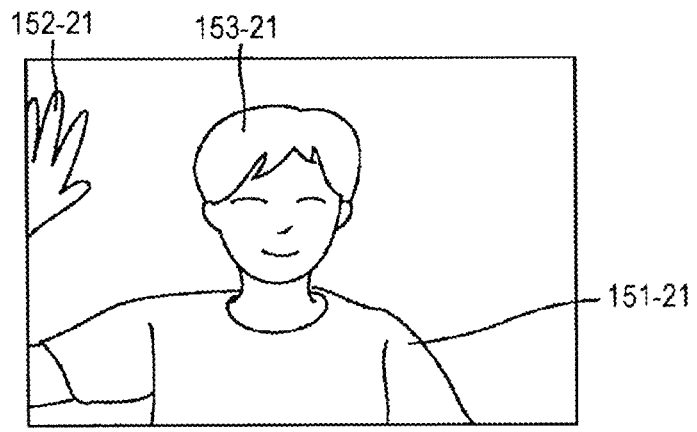
FIGS. 23A to 23C are diagrams illustrating examples of recognition results.

In step S61, the acquisition section 61 acquires the image in FIG. 23A. The image in FIG. 23A is an example of an image where the hand 152-21 does not fit within the angle of view of the camera since the person 151-21 is close to the camera 46A or the zoom ratio parameter of the camera 46A is set to a wide angle of view.

In step S62, the first recognition section 62 performs the first recognition process with regard to the acquired image in FIG. 23A, that is, a process where the hand 152-21 is recognized. However, it is not possible for the hand 152-21 to be recognized in the image in FIG. 23A since only a portion of the hand 152-21 is displayed.

In step S63, the determination section 64 determines whether the first recognition process, that is, recognition of the hand 152-21 was successful. It is determined in step S63 that the first recognition process has failed since it was not possible to recognize the hand 152-21 in the image in FIG. 23A and the process proceeds to step S64.

In step S64, the second recognition section 63 performs the second recognition process with regard to the acquired image in FIG. 23A, that is, a process where the face 153-21 is recognized. The image in FIG. 23A displays the face 153-21 with a sharp focus.

Figure 23B:
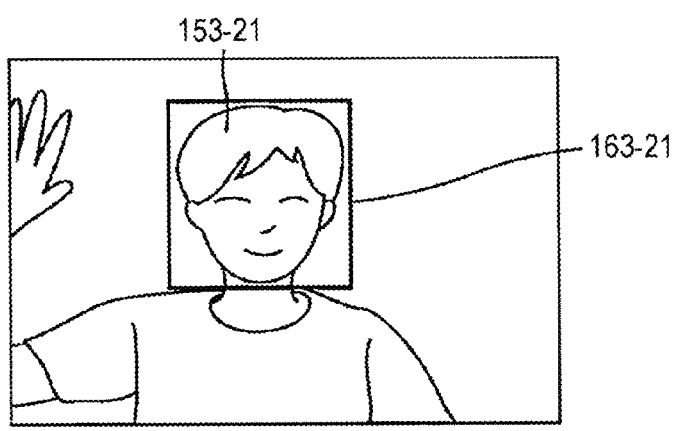

When the second recognition process is executed in step S64 and the face 153-21 is recognized, the face recognition frame 163-21 is set and displayed as shown in FIG. 23B.

In step S65, the determination section 64 determines whether the second recognition process was successful. In this case, it is determined in step S65 that the second recognition process was successful and the process proceeds to step S66.

In step S66, the acquisition section 61 acquires a new image quality parameter. In the case of the example of FIGS. 23A to 23C, the zoom ratio is stored as the image quality parameter and a new setting value is acquired from the setting value of the stored zoom ratio.

In step S67, the control section 65 controls the current image quality parameter so as to be changed to the new image quality parameter acquired in step S66. After the process of step S67, the process returns to step S61.

In the same manner as above, until it is determined in step S63 that the first recognition process was successful, the process from step S61 to S67 is repeated.

Figure 23C:
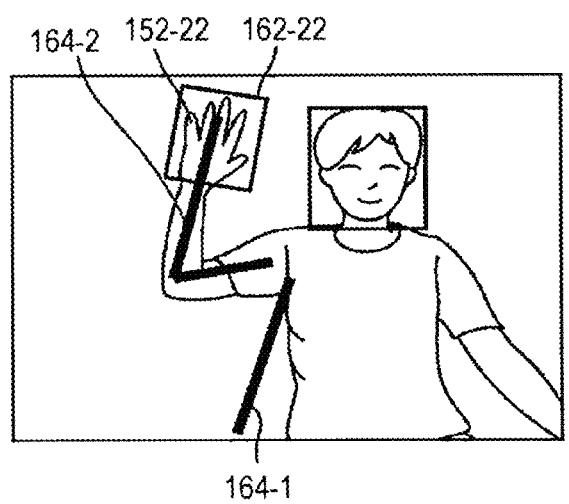

When an image which is appropriate for recognizing a hand is acquired in step S61, the hand recognition frame 162-22 is set and displayed in the vicinity of the hand 152-22 as shown in the image in FIG. 23C due to the execution of the first recognition process in step S62.

Then, it is determined in step S63 that the first recognition process was successful and the process proceeds to step S68.

In step S68, the determination section 64 determines whether the second recognition process was successful. In the case of the example in FIGS. 23A to 23C, it is determined in step S68 that the second recognition process was successful, that is, it is determined that the hand and face are recognized and the process proceeds to step S69.

In step S69, the posture recognition section 201 executes the posture recognition process. The posture recognition process will be described with reference to FIG. 24.

Posture Recognition Process

Figure 24:
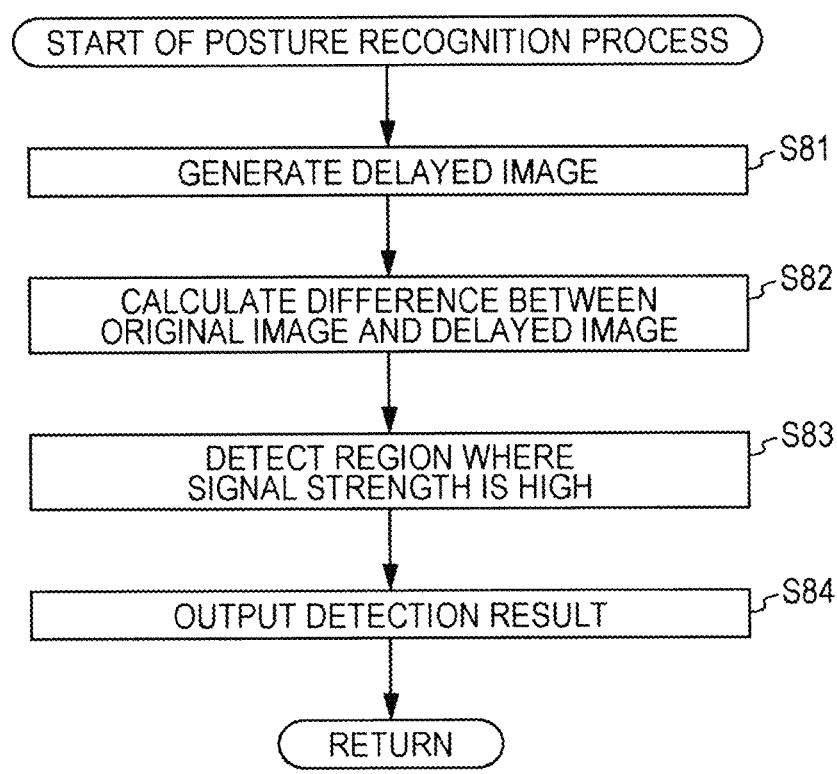
FIG. 24 is a flow chart describing an example of a posture recognition process.

FIG. 24 is a flow chart describing an example of the posture recognition process.

In step S81, the delayed image acquisition section 221 acquires a delayed image. The delayed image which is an image of an original image from a predetermined time beforehand is temporarily stored in the RAM 43.

In step S82, the calculation section 222 calculates the difference between the original image and the delayed image. In step S83, the signal strength detection section 223 detects a region where the signal strength is high from the image where the difference has been calculated. That is, the region, where the absolute value of the value of the difference is large, is detected.

For example, when a user moves their hand, the region of the position of the hand and the arm before the movement of the user and the position of the hand and the arm after the movement is detected.

In step S84, the detection result output section 224 overlaps and outputs the region, which is detected by the signal strength detection section 223, on the original image. An example where the detected region is overlapped and output on the original image will be described with reference to FIG. 23C.

In the image of FIG. 23C, a posture 164-1 and a posture 164-2 are set and output. The posture 164-1 shows the user before movement, that is, a position of the hand and the arm of the user in the delayed image. The posture 164-2 shows the user after movement, that is, a position of the hand and the arm of the user in the original image.

After the process of step S84 in FIG. 24, the process proceeds to step S70 in FIG. 22. In step S70, the determination section 64 determines whether the condition is satisfied. Conditions of the relative distance relationship and the relative angle relationship of the hand recognition frame 162 and the posture 164 will be described with reference to FIGS. 25, 26A and 26B.

Figure 25:
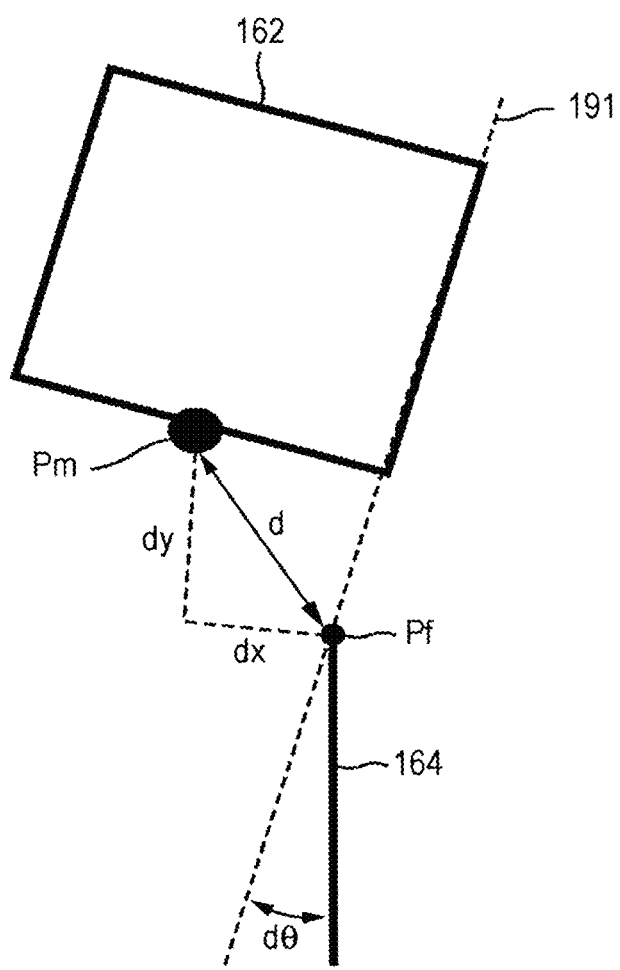
FIG. 25 is a diagram illustrating an example of relative distance and relative angle conditions.

FIG. 25 is a diagram which shows an example of the conditions of the relative distance relationship and the relative angle relationship conditions of the hand and the arm.

First, the relative distance relationship condition will be described. The relative distance is calculated as, for example, a calculation of a distance d between the coordinates at a central point of an edge out of the four edges of the hand recognition frame 162 which is the edge closest to an end of the posture 164 and the coordinates of an end of the posture 164 which is closest to the hand recognition frame 162. The distance d is calculated using equation (16).

$$d=\sqrt{dx^2+dy^2} \quad (16)$$

dx is calculated using the difference of the x coordinate of a central point Pm of a predetermined edge of the hand recognition frame 162 and the x coordinate of an end Pf (the end of the arm in this case) of the posture 164. In the same manner, dy is calculated using the difference of the y coordinate of the central point Pm of a predetermined edge of the hand recognition frame 162 and the y coordinate of the end Pf of the posture 164.

Then, the determination section 64 determines whether the following equation is satisfied. That is, it is determined whether the distance d is within the values d1 and d2 set in advance.

$$d1 \leq d < d2 \ (d_1, d_2: \text{ACTUAL NUMBER}) \quad (17)$$

In addition, as another example, when considering a normal distribution which is defined by being given an average value μd and a variance $\sigma_d^2$ in relation to the distance d, a predetermined range is specified where the value of the variance $\sigma_d^2$ is equal to or more than a threshold e0.

Then, the determination section 64 determines whether the following equation is satisfied. That is, it is determined whether the detected distance d is within a predetermined range from the average μd.

$$\text{NORMAL DISTRIBUTION } e = N(d|\mu_d, \sigma_d^2)$$

$$e > e0 \quad (18)$$

Next, the relative angle relationship condition will be described. The relative angle is expressed by an angle dθ which is possible between a parallel line 191, which is parallel to a predetermined edge of the hand recognition frame 162, and the posture 164.

As the edge corresponding to the parallel line 191, the edge where the angle dθ is smaller is selected out of the edges of the hand recognition frame 162. In the example of FIG. 25, the edge which is close in the vertical direction is selected.

When considering a normal distribution which is defined by being given an average value μθ and a variance $\sigma_\theta^2$ in relation to the angle dθ, a predetermined range is specified where the value of the variance $\sigma_\theta^2$ is equal to or more than a threshold f0.

Then, the determination section 64 determines whether the following equation is satisfied. That is, it is determined whether the detected angle dθ is within a predetermined range from the average μθ.

$$\text{NORMAL DISTRIBUTION } f = N(d\theta|\mu\theta, \sigma_\theta^2)$$

$$f > f0 \quad (9)$$

Here, the two conditions of the relative distance relationship and the relative angle relationship are described as the condition. However, the determination may be performed with the two conditions combined.

For example, equation (18) and equation (19) may be combined and the determination section 64 determines whether the following equation is satisfied.

$$q = ef$$

$$q > q0 \quad (20)$$

Figure 26A:
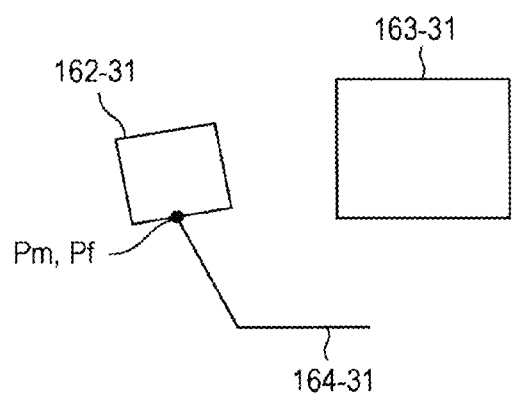
FIGS. 26A and 26B are diagrams illustrating examples of a determination result of relative distance condition.
Figure 26B:
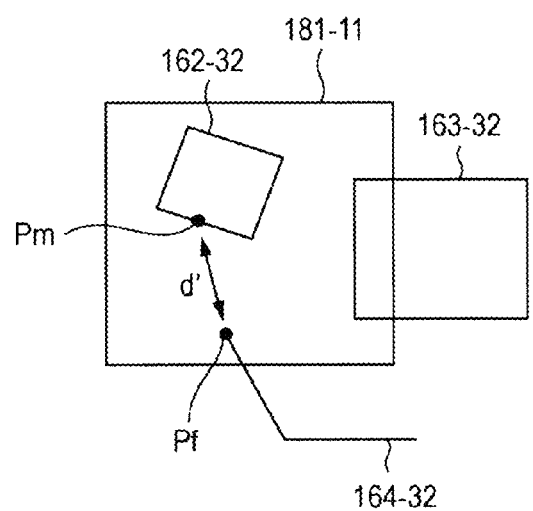

FIGS. 26A and 26B are diagrams which show examples of a determination result of the relative distance.

FIG. 26A is a diagram which shows an example where the relative distance relationship condition is satisfied. The hand recognition frame 162-31 and the posture 164-31 are in contact and the distance d is zero. Accordingly, since the distance between the hand recognition frame 162-31 and the posture 164-31 is within the range set in advance, the determination section 64 determines that the relative distance relationship condition is satisfied.

FIG. 26B is a diagram which shows an example where the relative distance relationship condition is not satisfied. As shown in FIG. 26B, the distance d between the coordinates at a central point of an edge out of the four edges of the hand recognition frame 162-32 which is the edge closest to an end of the posture 164-32 and the coordinates of an end of the posture 164-32 which is closest to the hand recognition frame 162-32 is d'.

Since there is a high possibility that the hand recognition result is an erroneous recognition when the distance d between the hand recognition frame 162-32 and the posture 164-32 is outside of the range set in advance, the determination section 64 determines that the relative distance relationship condition is not satisfied.

According to this, as shown in FIG. 26B, the relative position of the hand recognition frame 162-32 with regard to the face recognition frame 163-32 is within the detection region 181. Even if the relative positional relationship condition is satisfied, since the relative distance relationship condition of the hand recognition frame 162-32 and the posture 164-32 is not satisfied, the determination section 64 determines that the condition is not satisfied.

In this manner, with regard to the target object recognition process of FIG. 14, since it is determined whether it is possible to recognize the target object (for example, the hand) further using the recognition result of posture recognition (for example, the arm), it is possible to more reliably recognize the target object.

Returning to FIG. 22, in a case where it is determined in step S70 that the condition is not satisfied, the process proceeds to step S66.

In a case where it is determined in step S70 that the condition is satisfied, the process proceeds to step S71. In step S71, the output section 66 outputs the recognition success. After the process of step S71, the target object recognition process of FIG. 22 ends.

Configuration of Television Image Reception Device Control System

Next, a television image reception device control system 301 according to an embodiment will be described with reference to FIG. 27. FIG. 27 is a block diagram which shows a configuration example of the television image reception device control system 301 according to an embodiment of the disclosure.

For example, the television image reception device control system 301 executes a process, as the image processing device, which is the same as the target object recognition process 1 which was described above with reference to FIGS. 14 to 15C. The television image reception device control system 301 is configured from a camera 321, a control device 322, an image display device 323, and a RAM 324.

The camera 321 acquires an image based on the image quality parameter which has been set. In addition, the camera 321 is arranged in a position where it is possible for a user viewing the image display device 323 to be imaged.

Other than images of digital terrestrial broadcasting, BS broadcasting, CS broadcasting, or the like, the image display device 323 displays images acquired using the camera 321 when necessary.

The RAM 324 stores data, programs and the like which are necessary for the execution of various processes in the control device 322.

In the control device 322, a camera control engine 341, a person recognition engine 342, a hand recognition engine 343, a recognition result determination engine 344, a gesture recognition engine 345, a television image reception main engine (referred to below as TV main engine) 346, and a control CPU 348 are connected to each other using an image signal bus 347 and a bus 349.

The camera control engine 341 acquires an image from the camera 321. In addition, the camera control engine 341 controls the camera so that the image is an image based on the setting value of the image quality parameter described above.

The person recognition engine 342 recognizes a person as the recognition target object from the image acquired from the camera control engine 341 via the image signal bus 347. Specifically, the processing of the person recognition engine 342 is to perform the same process as the process of the second recognition section 63 in the target object recognition process 1.

The hand recognition engine 343 recognizes a hand as the recognition target object from the image acquired from the camera control engine 341 via the image signal bus 347. Specifically, the processing of the hand recognition engine 343 is to perform the same process as the process of the first recognition section 62 in the target object recognition process 1.

The recognition result determination engine 344 determines whether it is possible for the target object to be recognized based on the recognition results of the person recognition engine 342 and the hand recognition engine 343 acquired via the image signal bus 347 or the bus 349 and outputs the determination result. Specifically, the recognition result determination engine 344 executes the same processes as the processes of steps S43, S45, S48, S49 and S50 of FIG. 14.

The gesture recognition engine 345 recognizes the types of gestures of a person or a hand from the recognition result of the person recognition engine 342 or the hand recognition engine 343 acquired via the image signal bus 347.

The TV main engine 346 controls the output of the image to the image display device 323 based on the gesture recognition result of the gesture recognition engine 345 acquired via the bus 349 and instruction from the control CPU 348.

The control CPU 348 controls the operations of the camera control engine 341, the person recognition engine 342, the hand recognition engine 343, the recognition result determination engine 344, the gesture recognition engine 345, and the TV main engine 346 via the bus 349.

According to this, the television image reception device control system 301 acquires an image of the movement gestures of the user's hand using the camera 321, and performing of an operation such as the changing of a channel is possible without using a remote controller or the like since the types of gestures are recognized. The operation is the same as the case described above so the description is omitted.

Configuration of Digital Camera Control System

Next, a digital camera control system 401 according to an embodiment will be described with reference to FIG. 28. FIG. 28 is a block diagram which shows a configuration example of the digital camera control system 401 according to an embodiment of the disclosure.

For example, the digital camera control system 401 executes a process, as the image processing device, which is the same as the target object recognition process 2 which was described above with reference to FIGS. 14 and 20A to 20C. The digital camera control system 401 is configured from a camera 421, a control device 422, an image display device 423, a RAM 424, and a recording medium 425.

The camera 421 acquires an image. The image display device 423 displays the image acquired using the camera 421 or an image where image processing has been performed.

The RAM 424 stores data, programs and the like which are necessary for the execution of various processes in the control device 422. The recording medium 425 is controlled by the control device 422 and stores images which are captured by the camera 421 and other information.

In the control device 422, a camera signal process engine 441, a person recognition engine 442, a face recognition engine 443, a recognition result determination engine 444, an image sharpness adjustment engine 445, a JPEG (Joint Photographic Experts Group) engine 446, an image display engine 447 and a control CPU 449 are connected to each other by an image signal bus 448 and a bus 452.

In addition, the control CPU 449 and the external medium controller 451 are connected to each other via a data bus 450. The data bus 450 is also connected to the image signal bus 448.

The camera signal process engine 441 converts an analog data image acquired by the camera 421 and acquires a digital data image.

The person recognition engine 442 recognizes a person as the recognition target object from the image acquired from the camera signal process engine 441 via the image signal bus 448. Specifically, the processing of the person recognition engine 442 is the same as the process of the second recognition section 63 in the target object recognition process 2 described above.

The face recognition engine 443 recognizes a face as the recognition target object from the image acquired from the camera signal process engine 441 via the image signal bus 448. Specifically, the processing of the face recognition engine 443 is the same as the process of the first recognition section 62 in the target object recognition process 2 described above.

The recognition result determination engine 444 determines whether it is possible for the target object to be recognized based on the recognition results of the person recognition engine 442 and the face recognition engine 443 acquired via the image signal bus 448 or the bus 452 and outputs the determination result. Specifically, the same processes as the processes of steps S43, S45, S48, S49 and S50 of FIG. 14 are executed.

The image sharpness adjustment engine 445 performs image processing where the sharpness of the image from the camera signal process engine 441 acquired via the image signal bus 448 is adjusted.

The JPEG engine 446 performs compression and uncompression processes based on the JPEG standard with regard to the image from the camera signal process engine 441 and the image sharpness adjustment engine 445 which was acquired via the image signal bus 448.

The image display engine 447 outputs each type of image acquired via the image signal bus 448 to the image display device 423, and the images are displayed.

The control CPU 449 controls the camera signal process engine 441, the person recognition engine 442, the face recognition engine 443, the recognition result determination engine 444, the image sharpness adjustment engine 445, the JPEG engine 446, and the image display engine 447 via the bus 452.

The external medium controller 451 controls a recording medium 452, stores image data captured using the camera 421, reads out the stored image data, and display the image data on the image display device 423.

According to this, the digital camera control system 401 recognizes the face or the like of a user from the image acquired using the camera 421, improves the sharpness of the recognized face region, and records on the recording medium 425 so that it is possible for the user to capture an image which is more appropriate and perform recording and reproduction. The operation in this case is also the same as the case described above so the description is omitted.

Above, the recognition target is set as a person or a portion thereof. However, it is possible to set another object as the recognition target object. For example, in the information processing device which recognizes a car, it is possible to combine "body recognition", "tire recognition", "number plate recognition" and the like and execute the same recognition process.

Other

In the disclosure, in the program, the processes which are performed in a time series manner in the order described above may, of course, not necessarily be processed in a time series manner and also may include processes which are executed in parallel or independently.

The embodiments of the disclosure are not limited to the embodiment described above but various modifications are possible within the scope which does not depart from the concept of the disclosure.

The present disclosure contains subject matter related to that disclosed in Japanese Priority Patent Application JP 2010-260869 filed in the Japan Patent Office on Nov. 24, 2010, the entire contents of which are hereby incorporated by reference.

What is claimed is:

1. An information processing apparatus comprising:
a camera that captures an image according to an image quality parameter; and
a processing circuit that
performs a first recognition process on the image to detect a first target object in the image;
performs a second recognition process on the image to detect a second target object in the image;
determines whether the first target object in the image is detected based on a result of the first recognition process;
determines that the second target object in the image is detected based on a result of the second recognition process;
performs a posture recognition process, when the processing circuit determines that both the first target object and the second target object are detected, to detect a posture in the image, the posture being a positional relationship between the first target object and the second target object in the image, by calculating a difference between the image and a previous image captured by the camera and determining a region in the image in which a largest difference is calculated;
modifies the image quality parameter of the image to recognize the first target object in a subsequent image captured by the camera when the processing circuit determines that the first target object is not detected but the second target object is detected; and
modifies the image quality parameter of the image to recognize the first target object in a subsequent image captured by the camera when the processing circuit determines that the posture in the image is within a predetermined threshold.

2. The apparatus of claim 1, wherein the first target object is related to the second target object by at least one of
a relative size, and
the first target object being a part of the second target object.

3. The apparatus of claim 1, wherein the image quality parameter is one of
a camera control parameter, and
an image processing parameter.

4. The apparatus of claim 3, wherein the image quality parameter is the camera control parameter, and the camera control parameter is one of
a zoom ratio,
a focus position,
an aperture value,
a shutter time,
a gain value,
a color adjustment value, and
a camera orientation direction.

5. The apparatus of claim 3, wherein the image quality parameter is the image processing parameter, and the image processing parameter is one of
a brightness setting,
a contrast setting,
a color conversion,
a sharpness value,
a focus setting, and
a digital zoom ratio.

6. The apparatus of claim 1, wherein the first target object is a part of a human body, and the second target object is the human body.

7. The apparatus of claim 6, wherein the processing circuit detects the posture of the human body.

8. The apparatus of claim 1, wherein the processing circuit modifies the image quality parameter and recognizes the first target object in the subsequent image captured by the camera.

9. The apparatus of claim 1, wherein the camera is one of a digital still camera and a television camera.

10. The apparatus of claim 1, further comprising:
a display, wherein
the processing circuit outputs an instruction on the display to a user.

11. The apparatus of claim 10, wherein
the instruction output to the user is a prompt for a user input, and
the processing circuit modifies the image quality parameter according to the user input.

12. An information processing method comprising:
receiving an image from a camera, the image captured by the camera according to an image quality parameter;
performing, with a processing circuit, a first recognition process on the image to detect a first object in the image;

performing, with the processing circuit, a second recognition process on the image to detect a second object in the image;

determining, with the processing circuit, whether a first target object in the image is detected based on a result of the first recognition process;

determining, with the processing circuit, that a second target object in the image is detected based on a result of the second recognition process;

performing a posture recognition process, with the processing circuit when the processing circuit determines that both the first target object and the second target object are detected, to detect a posture in the image, the posture being a positional relationship between the first target object and the second target object in the image, by calculating a difference between the image and a previous image captured by the camera and determining a region in the image in which a largest difference is calculated;

modifying, with the processing circuit, the image quality parameter of the image to recognize the first target object in a subsequent image captured by the camera when the processing circuit determines that the first target object is not detected but the second target object is detected; and modifying, with the processing circuit, the image quality parameter of the image to recognize the first target object in a subsequent image captured by the camera when the processing circuit determines that the posture in the image is within a predetermined threshold.

13. The method of claim 12, wherein the first target object is related to the second target object by at least one of a relative size, and the first target object being a part of the second target object.

14. The method of claim 12, wherein the image quality parameter is one of a camera control parameter, and an image processing parameter.

15. The method of claim 14, wherein the image quality parameter is the camera control parameter, and the camera control parameter is one of a zoom ratio, a focus position, an aperture value, a shutter time, a gain value, a color adjustment value, and a camera orientation direction.

16. The method of claim 14, wherein the image quality parameter is the image processing parameter, and the image processing parameter is one of a brightness setting, a contrast setting, a color conversion, a sharpness value, a focus setting, and a digital zoom ratio.

17. The method of claim 12, wherein the first target object is a part of a human body, and the second target object is the human body.

18. The method of claim 17, wherein the performing of the posture recognition process includes detecting the posture of the human body.

19. The method of claim 12, wherein the modifying and recognizing the first target object in the subsequent image capture by the camera are performed in real time.

20. A non-transitory computer readable storage device having instructions stored therein that, when executed by a processing circuit, cause the processing circuit to:

receive an image from a camera, the image captured by the camera according to an image quality parameter;

perform a first recognition process on the image to detect a first object in the image;

perform a second recognition process on the image to detect a second object in the image;

determine whether a first target object in the image is detected based on a result of the first recognition process;

determine that a second target object in the image is detected based on a result of the second recognition process;

perform a posture recognition process, when the processing circuit determines that both the first target object and the second target object are detected, to detect a posture in the image, the posture being a positional relationship between the first target object and the second target object in the image, by calculating a difference between the image and a previous image captured by the camera and determining a region in the image in which a largest difference is calculated;

modify the image quality parameter of the image to recognize the first target object in a subsequent image captured by the camera when the first target object is not detected but the second target object is detected; and modify the image quality parameter of the image to recognize the first target object in a subsequent image captured by the camera when the processing circuit determines that the posture in the image is within a predetermined threshold.

* * * * *